United States Patent
Edge et al.

(10) Patent No.: US 12,170,936 B2
(45) Date of Patent: Dec. 17, 2024

(54) SYSTEMS AND METHODS FOR EFFICIENTLY SUPPORTING BROADCAST OF LOCATION ASSISTANCE DATA IN A WIRELESS NETWORK

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/826,844

(22) Filed: May 27, 2022

(65) Prior Publication Data

US 2022/0295232 A1   Sep. 15, 2022

Related U.S. Application Data

(63) Continuation of application No. 16/261,367, filed on Jan. 29, 2019, now Pat. No. 11,356,804.
(Continued)

(51) Int. Cl.
*H04W 4/029* (2018.01)
*H04W 4/02* (2018.01)
(Continued)

(52) U.S. Cl.
CPC ............ *H04W 4/029* (2018.02); *H04W 4/02* (2013.01); *H04W 4/06* (2013.01); *H04W 64/00* (2013.01); *H04W 48/10* (2013.01)

(58) Field of Classification Search
CPC ........ H04W 4/02; H04W 4/029; H04W 64/00
(Continued)

(56) References Cited

U.S. PATENT DOCUMENTS 6,313,787 B1   11/2001   King et al.
7,595,754 B2   9/2009   Mehta
(Continued)

FOREIGN PATENT DOCUMENTS

CN   101072430 A   11/2007
CN   101087482 A   12/2007
(Continued)

OTHER PUBLICATIONS

3GPP TS 36.305: "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN", Version 10.2.0, Release 10, Jun. 2011, pp. 51.
(Continued)

*Primary Examiner* — Charles N Appiah
*Assistant Examiner* — Frank E Donado
(74) *Attorney, Agent, or Firm* — Weaver Austin Villenueve & Sampson LLP

(57) ABSTRACT

Techniques are discussed herein for efficiently supporting broadcast of location assistance data (AD) in a wireless network to assist in locating a user equipment (UE). A location server (LS) may send some location AD, which may be optionally ciphered, to base stations for broadcast in cells supported by the base stations. Capability information provided by a UE to the LS indicating a level of support by the UE for receiving broadcast AD and supporting ciphering may enable the LS to determine whether, and what type of, additional AD needs to be sent to the UE by point to point means. An LS may use capability information received from a large number of UEs to assist in determining the types of location assistance data to be broadcast and usage of ciphering.

42 Claims, 13 Drawing Sheets

Related U.S. Application Data

(60) Provisional application No. 62/669,939, filed on May 10, 2018, provisional application No. 62/634,921, filed on Feb. 25, 2018.

(51) Int. Cl.
*H04W 4/06* (2009.01)
*H04W 64/00* (2009.01)
*H04W 48/10* (2009.01)

(58) Field of Classification Search
USPC .......................................... 455/456
See application file for complete search history.

(56) References Cited

U.S. PATENT DOCUMENTS

| | | | |
|---|---|---|---|
| 8,463,294 B2 | 6/2013 | Kone | |
| 8,538,444 B2 | 9/2013 | Lee et al. | |
| 8,620,255 B2 | 12/2013 | Edge et al. | |
| 8,909,239 B2 | 12/2014 | Edge et al. | |
| 9,119,167 B2 | 8/2015 | Edge et al. | |
| 9,271,256 B2 | 2/2016 | Edge et al. | |
| 9,435,874 B2 | 9/2016 | Edge et al. | |
| 9,699,758 B2 | 7/2017 | Edge et al. | |
| 10,383,081 B2 | 8/2019 | Edge et al. | |
| 11,191,056 B2 | 11/2021 | Fischer et al. | |
| RE48,934 E * | 2/2022 | Liu | H04W 24/08 |
| 2004/0087315 A1 | 5/2004 | Dufva et al. | |
| 2004/0267840 A1 | 12/2004 | Ono | |
| 2005/0272405 A1 | 12/2005 | Tomlinson et al. | |
| 2005/0272439 A1 | 12/2005 | Picciriello et al. | |
| 2007/0049344 A1 | 3/2007 | Van Der Velde et al. | |
| 2007/0120737 A1 | 5/2007 | Moilanen et al. | |
| 2007/0257838 A1 | 11/2007 | Cheng | |
| 2008/0113671 A1 | 5/2008 | Ghozati et al. | |
| 2008/0182592 A1 | 7/2008 | Cha et al. | |
| 2008/0228654 A1 | 9/2008 | Edge | |
| 2008/0242373 A1 | 10/2008 | Lu et al. | |
| 2009/0061898 A1 | 3/2009 | Johnson et al. | |
| 2009/0208001 A1 | 8/2009 | Kent, Jr. et al. | |
| 2009/0253422 A1 | 10/2009 | Fischer | |
| 2010/0090822 A1 | 4/2010 | Benson et al. | |
| 2010/0167746 A1 | 7/2010 | Lee et al. | |
| 2010/0232362 A1 | 9/2010 | Tenny | |
| 2010/0283677 A1 | 11/2010 | Halivaara | |
| 2011/0000360 A1 | 1/2011 | Saino et al. | |
| 2011/0032859 A1 | 2/2011 | Wirola et al. | |
| 2011/0039577 A1 | 2/2011 | Stern-Berkowitz et al. | |
| 2011/0081884 A1 | 4/2011 | Sennett et al. | |
| 2011/0117925 A1 | 5/2011 | Sampath et al. | |
| 2011/0200024 A1 | 8/2011 | Karaoguz et al. | |
| 2011/0212733 A1 | 9/2011 | Edge et al. | |
| 2011/0244889 A1 | 10/2011 | Kone | |
| 2012/0106740 A1 | 5/2012 | Kehren et al. | |
| 2012/0149392 A1 | 6/2012 | Siomina et al. | |
| 2012/0252492 A1 | 10/2012 | Chien | |
| 2013/0033999 A1 | 2/2013 | Siomina et al. | |
| 2013/0223626 A1 | 8/2013 | Edge et al. | |
| 2013/0225185 A1 | 8/2013 | Edge et al. | |
| 2013/0237247 A1 | 9/2013 | Lee et al. | |
| 2013/0252630 A1 | 9/2013 | Edge et al. | |
| 2013/0305053 A1 | 11/2013 | Laffey | |
| 2015/0099540 A1 | 4/2015 | Siomina et al. | |
| 2015/0208267 A1 | 7/2015 | Jung et al. | |
| 2015/0296475 A1 | 10/2015 | Burroughs et al. | |
| 2016/0029162 A1 * | 1/2016 | Edge | H04W 12/10 455/456.1 |
| 2016/0109582 A1 | 4/2016 | Sendonaris et al. | |
| 2016/0205499 A1 | 7/2016 | Davydov et al. | |
| 2017/0123072 A1 | 5/2017 | Miya et al. | |
| 2017/0134128 A1 | 5/2017 | Opshaug et al. | |
| 2017/0135036 A1 | 5/2017 | Schmidt et al. | |
| 2017/0317894 A1 | 11/2017 | Dao et al. | |
| 2017/0332192 A1 | 11/2017 | Edge | |
| 2018/0054699 A1 | 2/2018 | Edge et al. | |
| 2019/0007787 A1 * | 1/2019 | Gao | G01S 5/0205 |
| 2019/0098601 A1 | 3/2019 | Kumar et al. | |
| 2019/0268725 A1 | 8/2019 | Edge et al. | |
| 2019/0349881 A1 | 11/2019 | Choi et al. | |
| 2020/0037145 A1 | 1/2020 | Gunnarsson et al. | |
| 2020/0045667 A1 | 2/2020 | Modarres Razavi et al. | |
| 2020/0053690 A1 | 2/2020 | Fischer et al. | |
| 2020/0084586 A1 | 3/2020 | Ryden et al. | |
| 2020/0169831 A1 * | 5/2020 | Li | G01S 5/10 |
| 2020/0389766 A1 | 12/2020 | Kim et al. | |
| 2021/0045084 A1 | 2/2021 | Liu et al. | |

FOREIGN PATENT DOCUMENTS

| | | |
|---|---|---|
| CN | 101098182 A | 1/2008 |
| CN | 101155050 A | 4/2008 |
| CN | 101516059 A | 8/2009 |
| CN | 101622891 A | 1/2010 |
| CN | 101877818 A | 11/2010 |
| CN | 101888587 A | 11/2010 |
| CN | 102164340 A | 8/2011 |
| EP | 2360971 A2 | 8/2011 |
| JP | 2001208825 A | 8/2001 |
| JP | 2006058178 A | 3/2006 |
| JP | 2008535426 A | 8/2008 |
| JP | 2011015406 A | 1/2011 |
| JP | 2011022151 A | 2/2011 |
| WO | WO-0111382 A1 | 2/2001 |
| WO | WO-2006106187 A1 | 10/2006 |
| WO | WO-2008084382 A2 | 7/2008 |
| WO | WO-2009082728 A2 | 7/2009 |
| WO | WO-2009155278 | 12/2009 |
| WO | WO-2010105213 | 9/2010 |
| WO | WO 2010124011 | 10/2010 |
| WO | WO-2010130134 A1 | 11/2010 |
| WO | WO-2011069555 A1 | 6/2011 |
| WO | WO-2012108812 A1 | 8/2012 |
| WO | WO-2013033464 | 3/2013 |
| WO | WO-2014189841 A1 | 11/2014 |
| WO | WO 2017196510 | 11/2017 |

OTHER PUBLICATIONS

3GPP TS 36.355: "3rd Generation Partnership Project; Technical Specification Group Radio Access Network; Evolved Universal Terrestrial Radio Access (E-UTRA); LTE Positioning Protocol (LPP)", Version 10.2.0, Release 10, Jun. 2011, pp. 114.

3GPP TS 44.035: "Digital Cellular Telecommunications System (Phase 2+); Location Services (LCS); Broadcast Network Assistance for Enhanced Observed Time Difference (E-OTD) and Global Positioning System (GPS) Positioning Methods," ETSI TS 144 035, Version 10.0.0, Release 10, Apr. 2011, pp. 36.

3GPP TS 44.035: "3rd Generation Partnership Project; Technical Specification Group GSM/EDGE Radio Access Network; Location Services (LCS); Broadcast network assistance for Enhanced Observed Time Difference (E-OTD) and Global Positioning System (GPS) positioning methods", Release 10, Version 10.0.0, Mar. 2011, 34 Pages.

"3rd Generation Partnership Project; Technical Specification Group Radio Access Network; Evolved Universal Terrestrial Radio Access (E-UTRA); LTE Positioning Protocol (LPP) (Release 9)", 3GPP Standard; 3GPP TS 36.355, 3rd Generation Partnership Project (3GPP), Mobile Competence Centre; 650, Route Des Lucioles; F-06921 Sophia-Anti Polis Cedex; France, No. V9.2.1, XP050441988, Jun. 22, 2010, pp. 1-112.

"3rd Generation Partnership Project; Technical Specification Group Radio Access Network; Radio Resource Control (RRC); Protocol specification (Release 8)", 3GPP TS 25.331, V8.15.0, Jun. 2011, pp. 1-1739.

"3rd Generation Partnership Project; Technical Specification Group Radio Access Network; Stage 2 functional specification of User Equipment (UE) positioning in UTRAN (Release 10)", 3GPP TS 25.305, V10.0.0, Sep. 2010, 80 pages.

3rd Generation Partnership Project; Technical Specification Group Services and System Aspects; Telecommunication management;

(56) References Cited

OTHER PUBLICATIONS

Charging management; Location Services (LCS) charging (Release 10), 3GPP Standard; 3GPP TS 32.271, 3rd Generation Partnership Project (3GPP), Mobile Competence Centre ; 650, Route Des Lucioles ; F-06921 Sophia-Antipolis Cedex ; France, No. V10.0.0, Dec. 30, 2010 (Dec. 30, 2010) , pp. 1-26, XP050462465, [retrieved on Dec. 30, 2010].
CMCC, et al., "Way forward on Modification of Positioning SIBs", 3GPP TSG-RAN WG2 Meeting #102; R2-1808893, 3GPP Draft; R2-1808893 Modification of Positioning SIBS, 3rd Generation Partnership Project (3GPP), Mobile Competence Centre ; 650, Route Des Lucioles ; F-06921 Sophia-Antipolis Cedex ; France, vol. RAN WG2, No. Busan, Korea; May 21, 2018-May 25, 2018, May 25, 2018 (May 25, 2018), XP051520255, 12 Pages.
Ericsson: "On Representation, Broadcast and Ciphering of Positioning SIBs", 3GPP TSG-RAN WG2 Meeting #102, R2-1808111, 3GPP Draft; R2-1808111 on Representation, Broadcast and Ciphering of Positioning SIBS, 3rd Generation Partnership Project (3GPP), Mobile Competence Centre ; 650, Route Des Lucioles ; F-06921 Sophia-An , vol. RAN WG2, No. Busan, Korea ; May 21, 2018-May 25, 2018, May 11, 2018 (May 11, 2018), XP051519522, 8 Pages.
Ericsson: "Positioning SIB Value Tag and Expiration Time", 3GPP TSG-RAN WG2 Meeting #103, R2-1813169, 3GPP Draft; R2-1813169 LPP CR Positioning SIB Value Tag and Expiration Time_V6, 3rd Generation Partnership Project (3GPP), Mobile Competence Centre, 650, Route Des Lucioles, F-06921 Sophia-Antipolis, vol. RAN WG2, No. Gothenburg, Sweden; Aug. 20, 2018-Aug. 24, 2018, Sep. 1, 2018 (Sep. 1, 2018), XP051522727, 3 Pages.
Huawei, et al., "Switch Between Unicast and Broadcast", 3GPP Draft, R2-1803635, 3GPP TSG-RAN WG2 Meeting #101, Switch between Unicast and Broadcast, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, 2 Pages, Feb. 16, 2018, XP051400658, Retrieved from the Internet: URL: http://www.3gpp.org/ftp/tsg%5Fran/WG2%5FRL2/TSGR2%5F101/Docs/ [retrieved on Feb. 16, 2018].
International Search Report and Written Opinion—PCT/US2018/030747—ISA/EPO—Jul. 24, 2018.
International Preliminary Report on Patentability—PCT/US2012/053238, the International Bureau of WIPO—Geneva, Switzerland, Jan. 20, 2014.
International Preliminary Report on Patentability—PCT/US2019/016163, the International Bureau of WIPO—Geneva, Switzerland, Sep. 3, 2020.
International Preliminary Report on Patentability—PCT/US2019/045601, the International Bureau of WIPO—Geneva, Switzerland, Feb. 18, 2021.
International Preliminary Report on Patentability—PCT/US2018/030747, the International Bureau of WIPO—Geneva, Switzerland, Nov. 14, 2019.
International Search Report and Written Opinion—PCT/US2012/053238—ISA/EPO—Mar. 22, 2013.
International Search Report and Written Opinion—PCT/US2019/016163—ISA/EPO—Apr. 4, 2019.
International Search Report and Written Opinion—PCT/US2019/045601—ISA/EPO—Oct. 24, 2019.
Open Mobile Alliance, "LPP Extensions Specification", Candidate Version 1.0, Jun. 28, 2011, OMA-TS-LPPe-V1_0-20110628-C, pp. 1-280.
Open Mobile Alliance: "OMA-RD-LPPe-V1_0-20110628-C," LPP Extensions Requirements Candidate Version 1.0, Jun. 28, 2011, pp. 1-25.
Orange, et al., "A-GNSS in UTRAN", 3GPP Draft, R2-070907, 3GPP TSG RAN WG2-RAN2#57, GNSS in UTRAN, 3rd Generation Partnership Project (3GPP), Mobile Competence Centre; 650, Route Des Lucioles; F-06921 Sophia-Antipolis Cedex; France, vol. RAN WG2, No. St. Louis, USA; Feb. 20, 2007, Feb. 20, 2007 (Feb. 20, 2007), XP050133921, 99 Pages.
Partial International Search Report—PCT/US2012/053238—ISA/EPO—Dec. 20, 2012.
Qualcomm Europe: "Anticipated Impact on RAN2/3 Specifications of LTE Positioning Work Item", 3GPP Draft, R3-090703, 3GPP TSG-RAN WG3 #63bis, 3rd Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (Mar. 18, 2009), XP050341090, 6 Pages.
Qualcomm Incorporated : "Ciphering of Broadcast Assistance Data", 3GPP TSG-SA WG3 Meeting #88, S3-172025, Aug. 7-11, 2017, 7 pages.
Qualcomm Incorporated: "Evaluation of Option 1 and Option 2 for Ciphering Key Distribution to Suitably Subscribed UEs for Encrypted Broadcasted Positioning Data", 3GPP TSG CT4 Meeting #83, 3GPP Draft; C4-182149, 3rd Generation Partnership Project (3GPP), Mobile Competence Centre, 650, Route Des Lucioles, F-06921 Sophia-Antipolis Cedex, France, vol. CT WG4, No. Montreal, Canada; Feb. 26, 2018-Mar. 2, 2018, Feb. 15, 2018, XP051396296, 2 pages.
Qualcomm Incorporated: "LPPa Broadcast Assistance Data Information", 3GPP TSG-RAN WG3 Meeting #100; R3-183104, 3GPP Draft; R3-183104_(LPPA Broadcast)_V1, 3rd Generation Partnership Project (3GPP), Mobile Competence Centre, 650, Route Des Lucioles, F-06921 Sophia-Antipolis Cedex, France, vol. RAN WG3, No. Busan, Korea; May 21, 2018-May 25, 2018, May 11, 2018 (May 11, 2018), XP051527271, 5 Pages.
Qualcomm Incorporated: "Modification of Positioning SIBs", 3GPP TSG-RAN WG2 Meeting #103, R2-1812356, 3GPP Draft; R2-1812356_(POSSIB Modification Period), 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 9, 2018 (Aug. 9, 2018), XP051521962, 5 Pages.
Qualcomm Incorporated: "Modification of Positioning SIBs", 3GPP TSG-RAN WG2 Meeting #103, R2-1812378, 3GPP Draft, R2-1812378_(CR 36355 REL-15 Possib Modification Period), 3rd Generation Partnership Project (3GPP), Mobile Competence Centre; 650, Route Des Lucioles, F-06921 Sophia-Antipolis Cedex, FR, vol. RAN WG2, No. Gothenburg, Sweden; Aug. 20, 2018-Aug. 24, 2018, Aug. 9, 2018 (Aug. 9, 2018), XP051521980, 5 Pages.
Sorin D.J, et al., "Specifying and Verifying a Broadcast and a Multicast Snooping Cache Coherence Protocol," IEEE Transactions on Parallel and Distributed Systems, 2000, vol. 13 (6), pp. 1-23.
T1P1.5: "Modifications to Support Broadcast of GPS Assistance Data", 3GPP Draft; S2-000275, 3GPP TSG SA2 #11, 3rd Generation Partnership Project (3GPP), Mobile Competence Centre, 650, Route Des Lucioles, F-06921 Sophia-Antipolis Cedex, France, vol. SA WG2, No. Puerto Vallarta, Mexico, Feb. 4, 2000, Feb. 4, 2000 (Feb. 4, 2000), XP050232729, 6 Pages, [retrieved on Feb. 4, 2000].
Taiwan Search Report—TW107115273—TIPO—Aug. 16, 2021.
Taiwan Search Report—TW108104287—TIPO—Feb. 16, 2022.
Taiwan Search Report—TW108128400—TIPO—Sep. 6, 2022.
LG Electronics Inc: "Consideration on UE-based OTDOA Positioning", R2-1709276, 3GPP TSG-RAN WG2 Meeting #99, Berlin, Germany, Aug. 21-25, 2017, pp. 1-3.

* cited by examiner

SYSTEMS AND METHODS FOR EFFICIENTLY SUPPORTING BROADCAST OF LOCATION ASSISTANCE DATA IN A WIRELESS NETWORK

CROSS-REFERENCE TO RELATED APPLICATIONS

This application is a continuation of U.S. application Ser. No. 16/261,367, entitled "SYSTEMS AND METHODS FOR EFFICIENTLY SUPPORTING BROADCAST OF LOCATION ASSISTANCE DATA IN A WIRELESS NETWORK," filed Jan. 29, 2019, which claims the benefit of U.S. Provisional Application Nos. 62/634,921, entitled "SYSTEMS AND METHODS FOR EFFICIENTLY SUPPORTING BROADCAST OF LOCATION ASSISTANCE DATA," filed Feb. 25, 2018, and 62/669,939, entitled "SYSTEMS AND METHODS FOR EFFICIENTLY SUPPORTING BROADCAST OF LOCATION ASSISTANCE DATA," filed May 10, 2018, which are assigned to the assignee thereof and which are expressly incorporated herein by reference in their entireties.

BACKGROUND

Field

Subject matter disclosed herein relates to estimation of a location of a mobile device and more particularly to broadcast of positioning assistance data to help enable location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Alternatively, a mobile device may compute an estimate of its location using OTDOA techniques. Other position methods that may be used for a mobile device include use of a Global Navigation Satellite System (GNSS) such as GPS, GLONASS or Galileo, and use of Assisted GNSS (A-GNSS), where a network provides assistance data to a mobile device to assist the mobile device in acquiring and measuring GNSS signals and/or in computing a location estimate from the GNSS measurements.

Sending location assistance data to a mobile device (e.g. from a location server) to assist in acquiring and measuring signals and/or in computing a location estimate from the measurements may be useful not only for A-GNSS location but also for OTDOA and other position methods such as GNSS based Real Time Kinematics (RTK). However, sending assistance data individually to each mobile device may result in significant delay and/or consume significant resources in a network and/or mobile device including battery use in a mobile device to interact with a network. Therefore, broadcast of assistance data to many or all mobile devices may be preferred in some implementations. However, broadcast of location assistance data may not be possible or efficient for all types of location assistance data and may not be fully supported by all mobile devices. Therefore, techniques to improve the efficiency of broadcasting location assistance data may be desirable.

SUMMARY

A location server may send some location assistance data (AD), which may be optionally ciphered, to base stations for broadcast in cells supported by the base stations. Capability information provided by the user equipments (UEs) to the location server indicating the level of support by the UE for receiving broadcast AD and support of ciphering may enable the location server to determine whether, and what type of, additional AD needs to be sent to the UE by point to point means. The location server may use capability information received from a large number of UEs to assist in determining the types of location assistance data to be broadcast and usage of ciphering.

In one aspect, a method of obtaining location information performed by a user equipment (UE) includes receiving a first set of location assistance data that is broadcast by at least one wireless node; transmitting capability information to a location server comprising an indication of a level of support by the UE for receiving location assistance data via broadcast; receiving a request for location information from the location server; obtaining at least some of the location information based at least in part on the first set of location assistance data; and transmitting the at least some of the location information to the location server.

In one aspect, a user equipment (UE) capable of obtaining location information includes at least one wireless transceiver configured to wirelessly communicate with at least one wireless network; memory configured to store location assistance data and location information; and at least one processor coupled to the at least one wireless transceiver and the memory and configured to receive via the at least one wireless transceiver a first set of location assistance data that is broadcast by at least one wireless node, transmit via the at least one wireless transceiver capability information to a location server comprising an indication of a level of support by the UE for receiving location assistance data via broadcast, receive via the at least one wireless transceiver a request for location information from the location server, obtain via the at least one wireless transceiver at least some of the location information based at least in part on the first set of location assistance data, and transmit via the at least one wireless transceiver at least some of the location information to the location server.

In one aspect, a method of obtaining a location of a user equipment (UE) performed by a location server includes providing a first set of location assistance data to be broadcast by at least one wireless node; receiving capability information from the UE, the capability information comprising an indication of a level of support by the UE for receiving location assistance data via broadcast; determining a second set of location assistance data based at least in part on the first set of location assistance data and the capability information; sending the second set of the location assistance data to the UE when the second set of location assistance data is not a null set; sending a request for location information to the UE; receiving at least some of the location information from the UE; and determining an estimated location of the UE based on the at least some of the location information.

In one aspect, a location server for obtaining a location of a user equipment (UE) includes an external interface configured to communicate with a wireless network; memory configured to store location assistance data and location information; and at least one processor coupled to the external interface and the memory and configured to provide via the external interface a first set of location assistance data to be broadcast by at least one wireless node, receive via the external interface capability information from the UE, the capability information comprising an indication of a level of support by the UE for receiving location assistance data via broadcast, determine a second set of location assistance data based at least in part on the first set of location assistance data and the capability information, send via the external interface the second set of the location assistance data to the UE when the second set of location assistance data is not a null set, send via the external interface a request for location information to the UE, receive via the external interface at least some of the location information from the UE, and determine an estimated location of the UE based on the at least some of the location information.

In one aspect, a method of providing location assistance data by a location server includes receiving capability information from a plurality of user equipments (UEs) at a first set of times, wherein the plurality of UEs are in a first set of areas, the capability information for each UE in the plurality of UEs comprising an indication of a level of support by the UE for receiving location assistance data via broadcast; determining types of location assistance data to be broadcast at a second set of times and in a second set of areas by wireless nodes, based at least in part on the capability information received from the plurality of UEs, the first set of areas and the first set of times; and providing location assistance data to be broadcast at the second set of times and in the second set of areas by the wireless nodes, the location assistance data comprising the types of location assistance data.

In one aspect, a location server for providing location assistance data includes an external interface configured to communicate with a wireless network; memory configured to store location assistance data; and at least one processor coupled to the external interface and the memory and configured to receive, via the external interface, capability information from a plurality of user equipments (UEs) at a first set of times, wherein the plurality of UEs are in a first set of areas, the capability information for each UE in the plurality of UEs comprising an indication of a level of support by the UE for receiving location assistance data via broadcast, determine types of location assistance data to be broadcast at a second set of times and in a second set of areas by wireless nodes, based at least in part on the capability information received from the plurality of UEs, the first set of areas and the first set of times, and provide, via the external interface, location assistance data to be broadcast at the second set of times and in the second set of areas by the wireless nodes, the location assistance data comprising the types of location assistance data.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
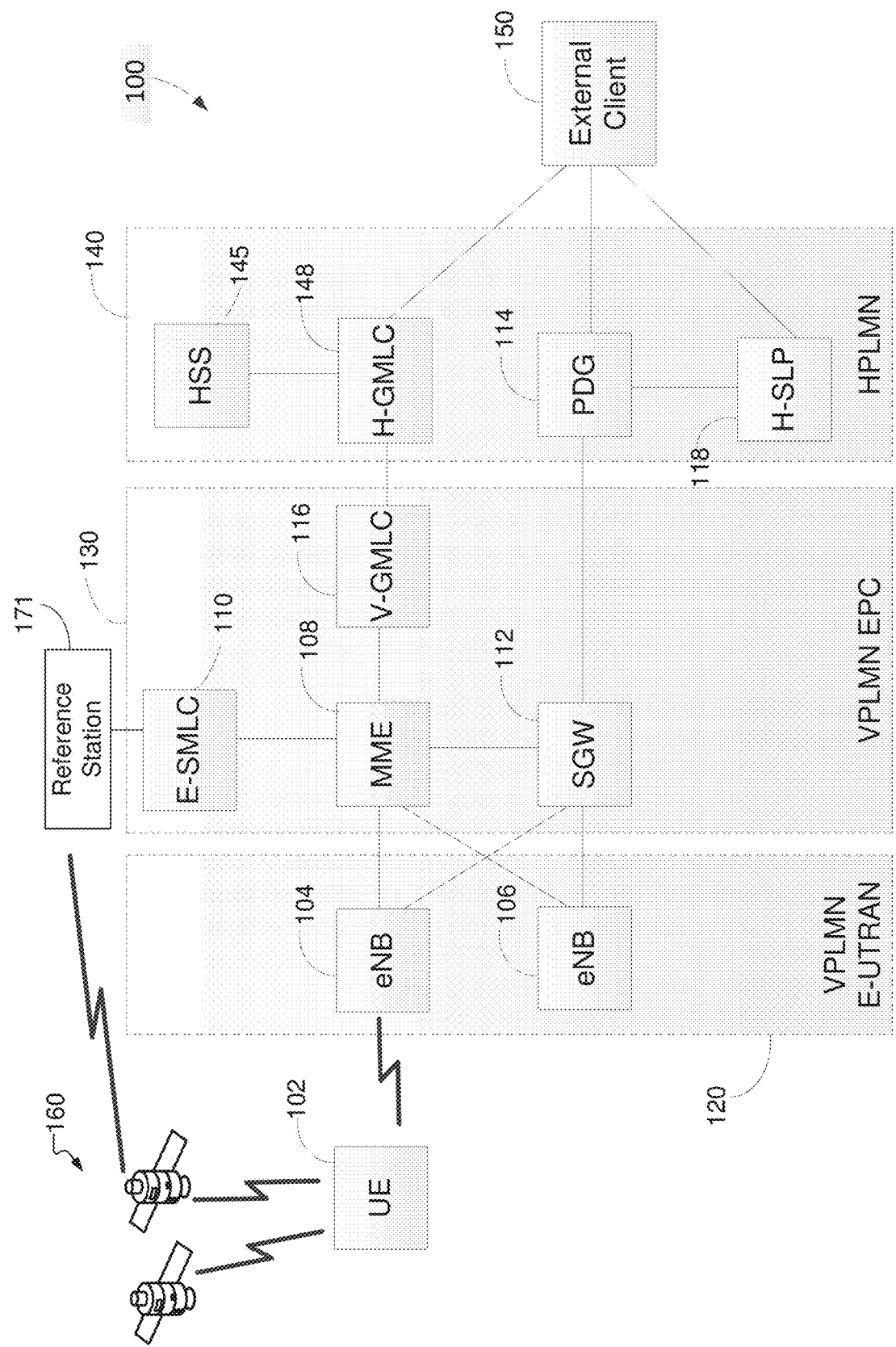
FIG. 1A is a system diagram illustrating certain features of a 4G communication system comprising a mobile device and a cellular network, in accordance with an example implementation.

Reference is made in the following detailed description to accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 111 may be indicated as 111-1, 111-2, 111-3 etc. When referring to such an element using only the first number, any instance of the element is to be understood (e.g. element 111 in the previous example would refer any of the elements 111-1, 111-2 and 111-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined for use by or with a wireless network: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G), LTE (4G), and New Radio (NR), also referred to as Fifth Generation (5G). These solutions are defined in 3GPP Technical Specifications (TSs) 23.271 (common part for 2G-4G), 43.059 (GSM access), 25.305 (UMTS access), 36.305 (LTE access) and 23.501 and 23.502 (NR access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a user equipment (UE) or may simply be accessible over the Internet or over a local Intranet. If positioning of a UE is needed, an LS may instigate a session (e.g. a CP location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from the UE, e.g. for A-GNSS, OTDOA and/or Enhanced Cell ID (ECID) position methods. Assistance data may be used by a UE to help acquire and measure GNSS and/or PRS signals (e.g. by providing expected characteristics of these signals such as frequency, expected time of arrival, signal coding, signal Doppler).

In a UE based mode of operation, assistance data may be used by a UE to help determine a location estimate of the UE from location measurements obtained by the UE (e.g., if the assistance data provides satellite ephemeris data in the case of A-GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and on other available data (e.g. satellite ephemeris data for GNSS location or base station characteristics including base station locations and possibly PRS timing in the case of terrestrial positioning using OTDOA).

In a standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from navigation data broadcast by GPS and GNSS satellites themselves) as well as sensors. It is noted that the terms "positioning assistance data", "location assistance data" and "assistance data" (AD) are used synonymously herein to refer to data which may be provided to a mobile device via broadcast or by point to point means (e.g. from an LS) to assist the mobile device to obtain location measurements (also referred to as positioning measurements) and/or to compute a location estimate from positioning measurements.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains an embedded LPPe message. The combined LPP and LPPe protocols may be referred to as LPP/LPPe. LPP and LPP/LPPe may be used to help support the 3GPP control plane solution for LTE access, in which case LPP or LPP/LPPe messages may be exchanged between a UE and E-SMLC. LPP or LPP/LPPe messages may be exchanged between a UE and E-SMLC via a serving Mobility Management Entity (MME) and a serving eNodeB for the UE. LPP and LPP/LPPe may also be used to help support the OMA SUPL solution for many types of wireless access that support IP messaging (such as NR, LTE and WiFi), where LPP or LPP/LPPe messages are exchanged between a SUPL Enabled Terminal (SET), which is the term used for a UE with SUPL, and an SLP, and may be transported within SUPL messages such as within a SUPL POS or SUPL POS INIT message.

An LS and a base station (e.g. an eNodeB for LTE access) may exchange messages to enable the LS to (i) obtain position measurements for a particular UE from the base station, or (ii) obtain location information from the base station not related to a particular UE, such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC.

During a location session with a UE, an LS may need to send assistance data to the UE to assist the UE to obtain requested location measurements and/or a location estimate, as discussed above. However, it may be more efficient to send location assistance data to many UEs via broadcast rather than to send assistance data to each individual UE by point to point means (e.g. using LPP). However, when an LS has a location session with any particular UE, the LS may not know which types of location assistance data the UE may be capable of receiving via broadcast. This may lead the LS either to send too little assistance data to the UE by point to point means (e.g., if the LS assumes the UE is able to receive more assistance data via broadcast than the UE is capable of receiving), or to send too much assistance data by point to point means (e.g. if the LS assumes the UE is capable of receiving less assistance data via broadcast than the UE is capable of receiving). Furthermore, the LS may not always enable broadcast of assistance data that is needed by UEs and/or may enable broadcast of assistance data that is not needed by UEs. Techniques discussed herein address these various problems.

FIG. 1A is a diagram illustrating a communication system 100 for location support of a user equipment (UE) 102 that supports and is currently using Long Term Evolution (LTE) radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 102, an Evolved Universal Mobile Telecommunications Service (UMTS) Terrestrial Radio Access (E-UTRA) Network (E-UTRAN) 120, and an Evolved Packet Core (EPC) 130. The E-UTRAN 120 and the EPC 130 may be part of a Visited Public Land Mobile Network (VPLMN) that is a serving network for the UE 102 and communicates with a Home Public Land Mobile Network (HPLMN) 140 for the UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the communication system 100 provides packet-switched services to the UE 102. However, as those skilled in the art will readily appreciate, the various concepts presented throughout this disclosure may be extended to networks providing circuit-switched services.

The UE 102 may comprise any electronic device configured for NB-IoT and/or LTE radio access, for example. The UE 102 may be referred to as a device, a wireless device, a mobile terminal, a terminal, a mobile station (MS), a mobile device, a SET, or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), New Radio (NR), WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi (also referred to as Wi-Fi) or Bluetooth® (BT). UE 102 may also support communication with one or more types of wireline network such as by using a Digital Subscriber Line (DSL) or packet cable for example. Although FIG. 1A shows only one UE 102, there may be many other UEs that can each correspond to UE 102.

The UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward the UE 102. The eNB 104 may comprise a serving eNB for UE 102 and may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver (not shown in FIG. 1A), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) and/or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and 5G NR. NB-IoT, GSM, WCDMA, LTE, eMTC and NR are technologies defined by 3GPP. CDMA and HRPD are technologies defined by the 3rd Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 may be connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from the UE 102 may be transferred. The MME 108 may be the serving MME for UE 102 and is then the control node that processes the signaling between the UE 102 and the EPC 130 and supports attachment and network connection of UE 102, mobility of UE 102 (e.g. via handover between network cells) as well as establishing and releasing data bearers on behalf of the UE 102. Generally, the MME 108 provides bearer and connection management for the UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may support location of the UE 102 using the 3GPP control plane (CP) location solution defined in 3GPP technical specifications (TSs) 23.271 and 36.305. The V-GMLC 116, which may also be referred to simply as a Gateway Mobile Location Center (GMLC) 116, may provide access on behalf of an external client (e.g. external client 150) or another network (e.g. HPLMN 140) to the location of UE 102. The external client 150 may comprise a web server or remote application that may have some association with UE 102 (e.g. may be accessed by a user of UE 102 via VPLMN E-UTRAN 120, VPLMN EPC 130 and HPLMN 140) or may be a server, application or computer system providing a location service to some other user or users which may include obtaining and providing the location of UE 102 (e.g. to enable a service such as friend or relative finder, asset tracking or child or pet location).

E-SMLC 110 may be connected to or have access to one or more reference stations 171 which may be part of VPLMN EPC 130 or separate from VPLMN EPC 130 (e.g. part of a GNSS reference network and owned and operated by a service provider different to the operator of VPLMN EPC 130). A reference station 171 may comprise or include a GNSS receiver configured to acquire, measure and decode signals transmitted by one or more GNSSs. A reference station 171 may be configured to obtain or determine orbital and timing data for Satellite Vehicles (SVs) 160 for one or more GNSSs and infer information for environmental factors that can affect GNSS location such as ionospheric and tropospheric delay. A reference station 171 may transfer determined information to E-SMLC 110—e.g. periodically or whenever the determined information changes.

As illustrated, the HPLMN 140 includes a Home Gateway Mobile Location Center (H-GMLC) 148 that may be connected to the V-GMLC 116 (e.g. via the Internet), as well as a Packet Data Network Gateway (PDG) 114 that may be connected to the SGW 112 (e.g. via the Internet). The PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when the UE 102 receives local IP breakout. The PDG 114 may be connected to a location server, such as H-SLP 118. The H-SLP 118 may support the SUPL UP location solution defined by OMA and may support location services for UE 102 based on subscription information for UE 102 stored in H-SLP 118. In some embodiments of communication system 100, a Discovered SLP (D-SLP) or Emergency SLP (E-SLP) (not shown in FIG. 1A), in or accessible from VPLMN EPC 130, may be used to locate UE 102 using the SUPL UP solution.

The H-GMLC 148 may be connected to a Home Subscriber Server (HSS) 145 for UE 102, which is a central database that contains user-related and subscription-related information for UE 102. The H-GMLC 148 may provide location access to the UE 102 on behalf of external clients such as external client 150. One or more of the H-GMLC 148, PDG 114, and H-SLP 118 may be connected to the external client 150, e.g., through another network, such as the Internet. In some cases, a Requesting GMLC (R-GMLC) located in another PLMN (not shown in FIG. 1A) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to the UE 102 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1A, both PLMNs (networks) may be the same PLMN. In that case, (i) the H-SLP 118, PDG 114, and HSS 145, may be in the same network (EPC) as the MME 108, and (ii) the V-GMLC 116 and the H-GMLC 148 may comprise the same GMLC.

In particular implementations, the UE 102 may have circuitry and processing resources capable of obtaining location related measurements (also referred to as location measurements), such as measurements for signals received from GPS or other Satellite Positioning System (SPS) SVs 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as the E-SMLC 110, H-SLP 118 or LMF 184 (described later for FIG. 1B), after which the location server may estimate or determine a location for UE 102 based on the measurements.

Location related measurements obtained by UE 102 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate location server (e.g. E-SMLC 110, H-SLP 118 or LMF 184) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WLAN (also referred to as WiFi positioning), or combinations thereof. In some of these techniques (e.g. A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 102. Here, location servers, such as E-SMLC 110, H-SLP 118 or LMF 184, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by UE 102 and/or, in some cases, enabling UE 102 to compute its estimated location based on the location measurements. For example, a location server may comprise an almanac (e.g., a Base Station Almanac (BSA)) which indicates the locations and identities of cellular transceivers and transmitters (e.g. eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency.

In the case of ECID, a UE 102 may obtain measurements of signal strength (e.g. received signal strength indication (RSSI) or reference signal received power (RSRP)) for signals received from cellular transceivers (e.g., eNBs 104, 106) and/or local transceivers and/or may obtain a signal to noise ratio (S/N), a reference signal received quality (RSRQ), or a round trip signal propagation time (RTT) between UE 102 and a cellular transceiver (e.g., eNB 104 or 106) or a local transceiver. A UE 102 may transfer these measurements to a location server, such as E-SMLC 110, H-SLP 118 or LMF 184, to determine a location for UE 102, or in some implementations, UE 102 may use these measurements together with positioning assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Position Reference Signal (PRS) or Cell Specific Reference Signal (CRS), received from nearby transceivers or base stations (e.g. eNBs 104 and 106). An RSTD measurement may provide the time of arrival difference between signals (e.g. CRS or PRS) received at UE 102 from two different transceivers (e.g. an RSTD between signals received from eNB 104 and from eNB 106). The UE 102 may return the measured RSTDs to a location server (e.g. E-SMLC 110, H-SLP 118 or LMF 184) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 102 may be referred to as a location, location estimate, location fix, fix, position, position estimate or position fix, and may be geodetic, thereby providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which the UE 102 is expected to be located with some given or default probability or confidence level (e.g., 67% or 95%). A location of a UE 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location or some previous location for UE 102. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for the UE 102 may be referred to as positioning of the UE 102 or locating the UE 102.

According to an embodiment, communication system 100 may be configured to deliver positioning assistance data in downlink broadcast messages to UE devices such as UE 102. For example, positioning assistance data may be broadcasted in system information blocks (SIBs) in downlink messages from eNBs 104 and 106. Furthermore, positioning assistance data that is broadcasted in the SIBs may be key encrypted (also referred to as being ciphered). UE 102 may receive one or more cipher keys in messages other than the broadcast messages for use in decrypting the broadcasted positioning assistance data.

Figure 1B:
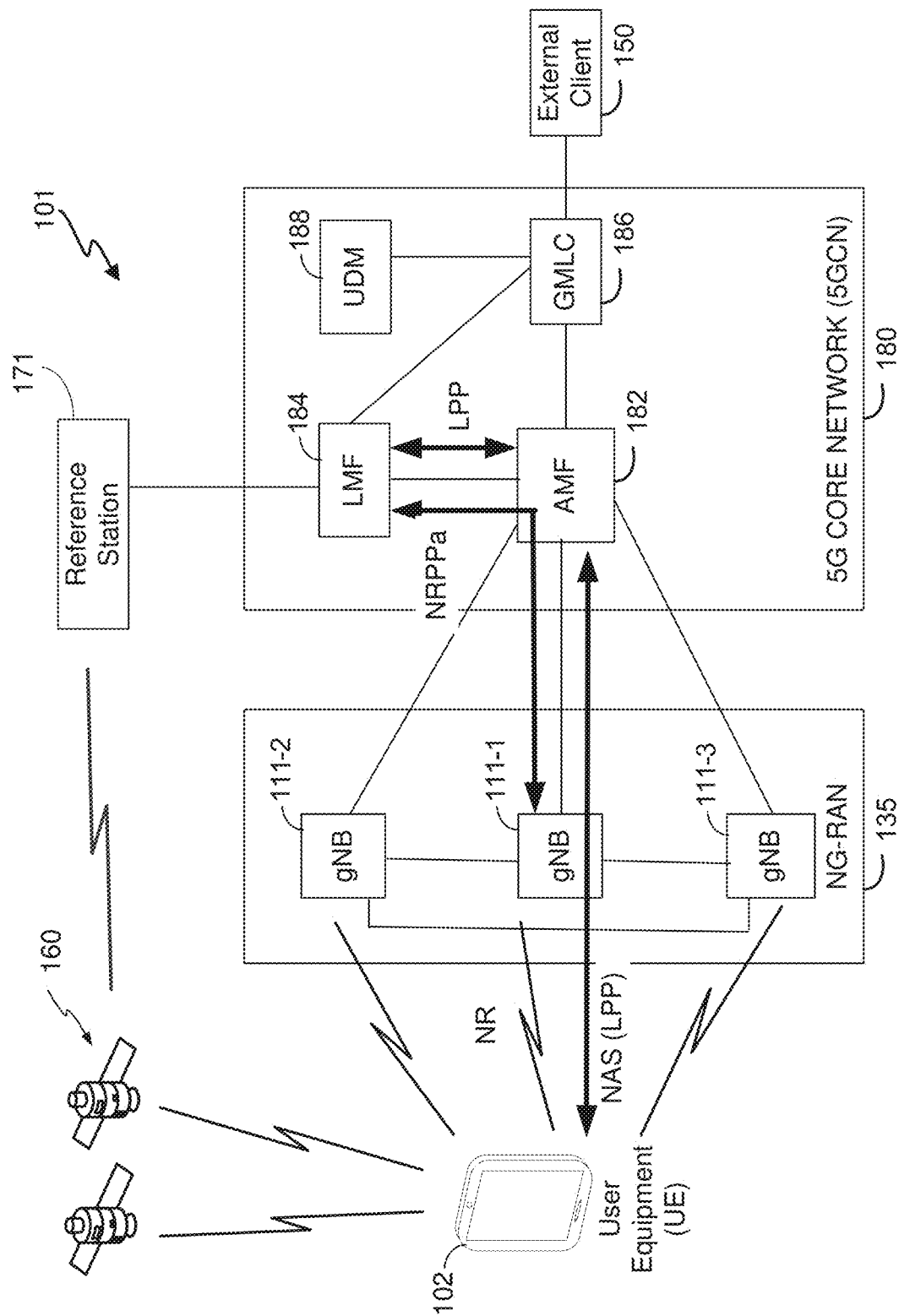
FIG. 1B is a system diagram illustrating certain features of a 5G communication system comprising a mobile device and a cellular network, in accordance with an alternative example implementation.

FIG. 1B shows a diagram of a communication system 101, according to an alternative embodiment to the embodiment of communication system 100 described above with reference to FIG. 1A. In communication system 101, UE 102, reference station(s) 171, SVs 160 and external client 150 may operate in connection with Fifth Generation (5G) features of communication system 101. According to an embodiment, communication system 101 may be configured to deliver positioning assistance data in downlink broadcast messages to UE devices such as UE 102. For example, positioning assistance data may be broadcasted in system information blocks (SIB s) in downlink messages from gNBs 111. Furthermore, positioning assistance data that is broadcasted in the SIBs may be key encrypted. UE 102 may receive one or more cipher keys in messages other than the broadcast messages for use in decrypting the broadcasted positioning assistance data.

The communication system 101 may be configured to implement broadcast of assistance data from base stations. Here, the communication system 101 comprises a UE 102, and components of a Fifth Generation (5G) network comprising a Next Generation Radio Access Network (NG-RAN) 135 and a 5G Core Network (5GCN) 180. A 5G network may also be referred to as a New Radio (NR) network; NG-RAN 135 may be referred to as an NR Radio Access Network (RAN) or as a 5G RAN; and 5GCN 180 may be referred to as a Next Generation Core network (NGC). In this context, a "3GPP New Radio" means a base station configured to implement portions of a 5G or NR service or a 5G or NR compatible service. The communication system 101 may further utilize information from SVs 160 for a Global Navigation Satellite System (GNSS) like GPS, GLONASS, Galileo or Beidou. Additional components of the communication system 101 are described below. The communication system 101 may include additional or alternative components.

It should be noted that FIG. 1B provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 101. Similarly, the communication system 101 may include a larger or smaller number of SVs 160, gNBs 111, external clients 150, and/or other components. The illustrated connections that connect the various components in the communication system 101 include data and signaling connections which may include additional (intermediary) components, direct or indirect physical and/or wireless connections, and/or additional networks. Furthermore, components may be rearranged, combined, separated, substituted, and/or omitted, depending on desired functionality.

Base stations (BSs) in the NG-RAN 135 shown in FIG. 1B comprise NR Node Bs, also referred to as gNBs, 111-1, 111-2 and 111-3 (collectively and generically referred to herein as gNBs 111). Pairs of gNBs 111 in NG-RAN 135 may be connected to one another—e.g. directly as shown in FIG. 1B or indirectly via other gNBs 111. Access to the 5G network is provided to UE 102 via wireless communication between the UE 102 and one or more of the gNBs 111, which may provide wireless communications access to the 5GCN 180 on behalf of the UE 102 using 5G. In FIG. 1B, the serving gNB for UE 102 is assumed to be gNB 111-1, although other gNBs (e.g. gNB 111-2 and/or gNB 111-3) may act as a serving gNB if UE 102 moves to another location or may act as a secondary gNB to provide additional throughout and bandwidth to UE 102. Some gNBs 111 in FIG. 1B (e.g. gNB 111-2 or gNB 111-3) may be configured to function as positioning-only beacons which may transmit signals (e.g. PRS signals) and/or broadcast assistance data to assist positioning of UE 102 but may not receive signals from UE 102 or from other UEs.

In some implementations, NG-RAN 135 may include one or more next generation eNBs (ng-eNBs, not shown in FIG. 1B) which may provide LTE radio access to UE 102 and connectivity of UE 102 to elements in 5GCN 180 (e.g. AMF 182) and/or to external client 150. An ng-eNB in NG-RAN 135 may be connected to one or more other ng-eNB s in NG-RAN 135, to one or more gNBs 111 and/or to AMF 182.

As noted, while FIG. 1B depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 180. Thus, the NG-RAN 135 may include any combination of gNBs, eNBs, ng-eNBs, or other types of base stations or access points.

The gNBs 111 may communicate with an Access and Mobility Management Function (AMF) 182, which, for positioning functionality, communicates with a Location Management Function (LMF) 184. The AMF 182 may support registration and mobility of the UE 102, including cell access, cell change and handover and may participate in supporting a signaling connection to the UE 102 and possibly data and voice bearers for the UE 102. The LMF 184 may support positioning of the UE 102 when UE accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), round trip signal propagation time (RTT), angle of departure (AOD), angle of arrival (AOA), and other position methods. The LMF 184 may also process location services requests for the UE 102, e.g., received from the AMF 182. In some embodiments, a node/system that implements the LMF 184 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The Gateway Mobile Location Center (GMLC) 186 may support a location request for the UE 102 received from an external client 150 and may forward such a location request to the AMF 182 for forwarding by the AMF 182 to the LMF 184 or may forward the location request directly to the LMF 184. A location response from the LMF 184 (e.g. containing a location estimate for the UE 102) may be similarly returned to the GMLC 186 either directly or via the AMF 182, and the GMLC 186 may then return the location response (e.g., containing the location estimate) to the external client 150. The GMLC 186 is shown connected to both the AMF 182 and LMF 184 but only one of these connections may be supported by 5GCN 180 in some implementations. A Unified Data Management (UDM) 188 may store subscription data for UE 102 in the case that 5GCN 180 is part of an HPLMN for UE 102 and may perform similar functions to HSS 145 in communication system 100.

As further illustrated in FIG. 1B, the LMF 184 and the gNBs 111 may communicate using an NR Positioning Protocol A (which may be referred to as NRPPa), which may be similar to the LTE Positioning Protocol A (LPPa) and defined in 3GPP TS 38.445. Here, NRPPa messages may be transferred between the gNBs 111 and the LMF 184 via the AMF 182. As further illustrated in FIG. 1B, LMF 184 and UE 102 may communicate using LPP, where LPP messages are transferred between the UE 102 and the LMF 184 via the AMF 182 and a serving gNB 111-1 for UE 102. For example, LPP messages may be transferred between the LMF 184 and the AMF 182 using service operations based on the HyperText Transfer Protocol (HTTP), and may be transferred between the AMF 182 and the UE 102 using a 5G Non-Access Stratum (NAS) protocol. In some embodiments, LPP may be replaced or augmented by an NR positioning protocol (NRPP or NPP). The LPP (and/or NPP or NRPP) protocol may be used to support positioning of UE 102 using UE assisted and/or UE based position methods such as A-GNSS, RTK, OTDOA, ECID, RTT, AOD, or AOA. The NRPPa protocol may be used to support positioning of UE 102 using network based position methods such as ECID (when used with measurements obtained by a gNB 111) and/or may be used by LMF 184 to obtain location related information from gNBs 111 such as parameters defining PRS transmission from gNBs 111 and location coordinates of gNBs 111.

When NG-RAN 135 includes one or more ng-eNBs, an ng-eNB in NG-RAN 135 may communicate with LMF 184 using NRPPa and/or may enable transfer of LPP (and/or NPP or NRPP) messages between UE 102 and LMF 184 via the ng-eNB and AMF 182. An ng-eNB in NG-RAN 135 may also broadcast positioning assistance data to UEs such as UE 102.

Information provided by the gNBs 111 (or by ng-eNBs in NG-RAN 135) to the LMF 184 using NRPPa may include timing and configuration information for PRS transmission and location coordinates of the gNBs 111 (or the ng-eNBs).

The LMF 184 can then provide some or all of this information to the UE 102 as assistance data in an LPP (and/or NPP or NRPP) message via the NG-RAN 135 and the 5GCN 180.

An LPP (and/or NPP or NRPP) message sent from the LMF 184 to the UE 102 may instruct the UE 102 to do any of a variety of things, depending on desired functionality. For example, an LPP (and/or NPP or NRPP) message could contain an instruction for the UE 102 to obtain measurements for GNSS (or A-GNSS), wireless LAN, ECID, and/or OTDOA (or some other position method). In the case of OTDOA, the LPP (and/or NPP or NRPP) message may instruct the UE 102 to obtain one or more measurements (e.g. Reference Signal Time Difference (RSTD) measurements) of PRS signals transmitted within particular cells supported by particular gNBs 111 (or supported by some other type of base station). The UE 102 may send the measurements back to the LMF 184 in an LPP (and/or NPP or NRPP) message (e.g. inside a 5G NAS message) via the serving gNB 111-1 and the AMF 182.

In embodiments, LMF 184 may encode location assistance data and optionally cipher the encoded location assistance data and send the encoded and optionally ciphered location assistance data to a gNB 111 or an ng-eNB (e.g. using NRPPa) for broadcast to UEs 102.

It is noted that the description below and illustrations in FIGS. 2-9 of broadcast of positioning assistance data are mostly directed to the example communication system 100 of FIG. 1A. However, the description and illustration should be understood to apply also to the example communication system 101 of FIG. 1B. In such a case, references below to E-UTRAN 120, EPC 130, eNB 104, eNB 106, MME 108, E-SMLC 110, V-GMLC 116 and LPPa may be replaced, respectively, by references to NG-RAN 135, 5GCN 180, gNB 111-1 (or an ng-eNB in NG-RAN 135), gNB 111-2 (or gNB 111-3 or an ng-eNB in NG-RAN 135), AMF 182, LMF 184, GMLC 186 and NRPPa.

Figure 2:
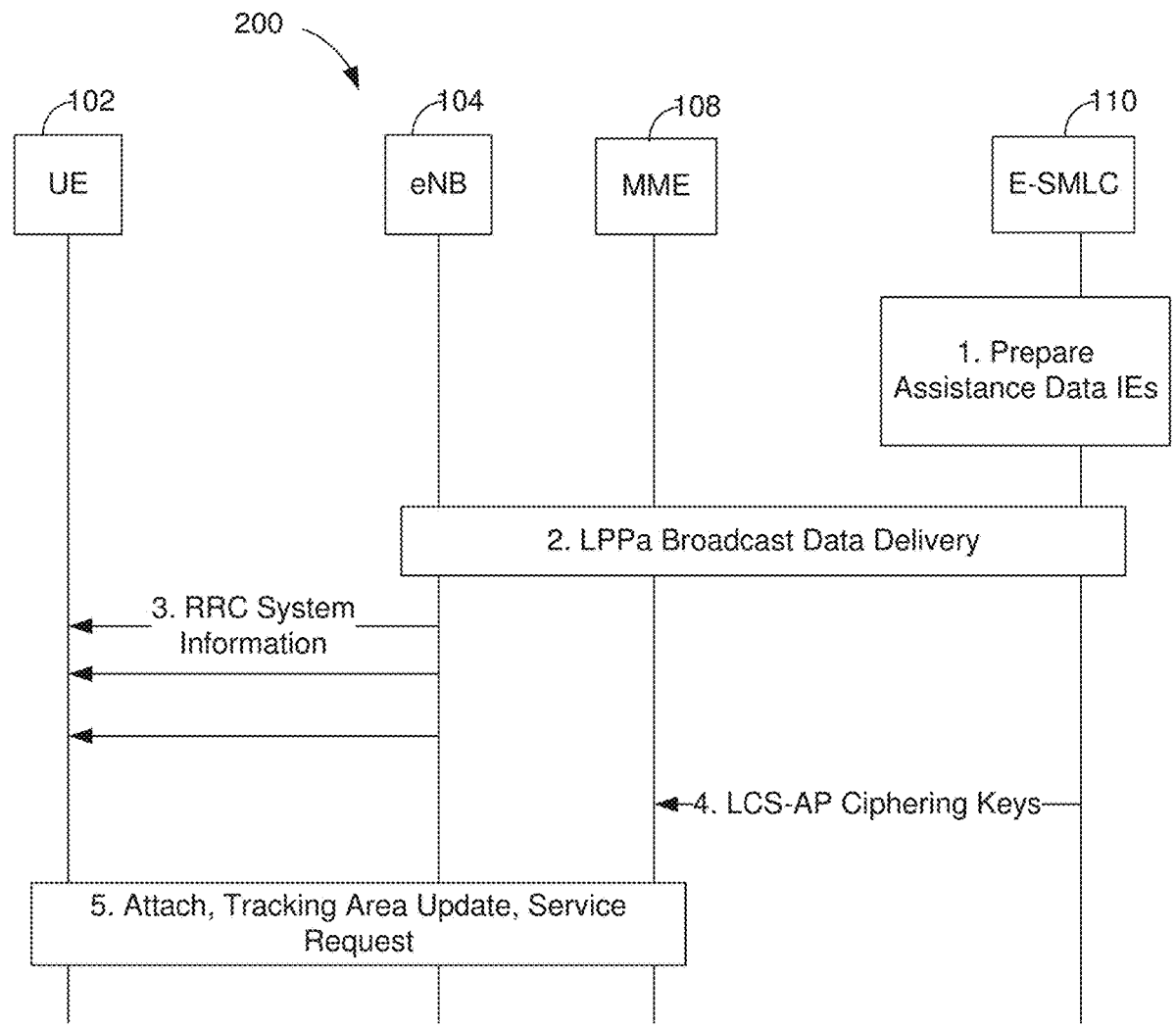
FIGS. 2, 3, and 4 are signaling flow diagrams showing broadcast of positioning assistance data according to various embodiments.

FIG. 2 shows an example signaling flow 200 for broadcasting positioning assistance data using LTE as in communication system 100. At stage 1 in signaling flow 200, the various assistance data elements for each supported positioning method are collected, processed and formatted at the E-SMLC 110. For example, the E-SMLC 110 may gather data (e.g. for GNSS, RTK and/or OTDOA) from reference station 171 and/or other sources (e.g. eNB 104, eNB 106, an Operations and Maintenance (O&M) server (not shown in FIG. 1A)). The E-SMLC 110 may then encode and optionally cipher System Information Block (SIB) content. For example, the ciphering may use the 128-bit Advanced Encryption Standard (AES) algorithm defined by the National Institute of Standards and Technology (NIST) in the United States. For example, AES counter mode may be used.

At stage 2, the encoded and optionally ciphered assistance data information is provided to the eNB 104 (e.g. via MME 108) and to other eNBs such as eNB 106 using LPPa procedures. E-SMLC 110 may assume that assistance data provided at stage 2 is broadcast at stage 3 by eNB 104 based on an acknowledgement from eNB 104, lack of an error response from eNB 104, a previous negotiation with eNB 104 to broadcast the AD and/or on network configuration (e.g. O&M) indicating this.

At stage 3, the eNB 104 includes the received assistance data in System Information Block (SIB) Messages which may be for a Radio Resource Control (RRC) protocol for LTE access as defined in 3GPP TS 36.331. The assistance data are broadcast (or broadcasted) by the eNB 104 (and by other eNBs such as eNB 106) using System Information Blocks (SIBs). The UE 102 may apply a system information acquisition procedure (e.g. defined in 3GPP TS 36.331) to acquire the assistance data information that is broadcasted.

In some implementations, a SIB containing positioning AD may be segmented by E-SMLC 110 or by eNB 104 prior to broadcast if the overall size of the SIB exceeds a maximum System Information (SI) message size (e.g. as defined for RRC in 3GPP TS 36.331). Segmentation may involve fragmenting a SIB into a sequence of two or more SIB segments which are each broadcast in a separate SI message.

At stage 4, and if at least some of the broadcast assistance data is ciphered at stage 2, the E-SMLC 110 provides the ciphering keys (also referred to just as "keys") being used to MME 108 and other MMEs. For example, the ciphering keys may be provided at stage 4 using a Location Services Application Protocol (LCS-AP) message. Information that is provided for each key at stage 4 may include an identification of applicable SIBs, a key value, a key identifier, an area of applicability (e.g. a set of LTE Tracking Areas), and a time (and/or duration) of key applicability.

At stage 5, the MME 108 distributes the keys to suitably subscribed UEs (e.g. UE 102) using a NAS mobility management procedure (e.g. as defined in 3GPP TS 23.401 or 3GPP TS 23.271) such as an Attach, Tracking Area Update and/or a Service Request. Alternatively, a Supplementary Services procedure may be used to distribute the keys (e.g., a Mobile Originated Located Request (MO-LR)). The keys may be used by a UE (e.g. UE 102) to decipher the assistance data in a SIB broadcast at stage 3 when ciphering is used.

A general problem with an AD broadcast capability is that a location server will typically not know which kinds of AD are supported by UEs that are currently being served in different cells in the wireless network, whether these UEs are subscribed to receive ciphered AD, or how many of these UEs there are in each network cell. This may lead to inefficient broadcast of AD in a cell where: (a) the wrong AD is broadcast in the cell (e.g., broadcast of AD that is not supported by UEs currently in the cell or broadcast of ciphered AD to UEs not subscribed to receive ciphered AD); (b) the correct AD is not broadcast in the cell (e.g., failing to broadcast AD that is supported by UEs or failing to broadcast ciphered AD to subscribing UEs); (c) AD is broadcast when there are few or no UEs in the cell to receive the AD; and/or (d) AD is not broadcast in a cell when there are many UEs in the cell to receive the AD (e.g., such as at a sports stadium or venue when a large event is occurring). In addition, when attempting to obtain, or to assist a UE to obtain, a location for a UE, a location server may not know which AD needs to be sent point to point to the UE versus sent via broadcast.

One solution to this general problem would be to allow a UE to provide capability information to a location server to indicate a level of UE support for receiving location AD via broadcast. The capability information, for example, may be sent using LPP (and/or NPP or NRPPa) capabilities. For example, one or more of the following capabilities may be added to LPP (and/or to NPP or NRPP) to enable a UE to send these capabilities to a location server: (i) an identification of particular SIBs containing broadcast AD that can be received and decoded by a UE; (ii) an identification of particular GNSSs supported by a UE for GNSS and RTK related SIBs identified in (i); (iii) an identification of particular types of AD which can be received and decoded by a UE using broadcast; and/or (iv) an identification of particular SIBs and/or particular types of AD which a UE can currently receive in ciphered form via broadcast (e.g. due to having obtained a ciphering key from the network as at stage 5 in signaling flow 200).

A location server (LS) may use the capability information provided by the UEs to more efficiently broadcast AD as follows. For a location session with one UE, the LS can send AD point to point to the UE only if the AD is not being broadcast or is not supported by the UE using broadcast (e.g. to reduce the amount of AD sent point to point). For location sessions with multiple UEs, the LS can select particular AD to send (or not to send) via broadcast when many of the UEs indicate (or do not indicate) support for receiving the particular AD via broadcast. For location sessions with many UEs, an LS can decide whether to cipher or not to cipher particular types of AD based on a level of ciphering support indicated by the UEs. For example, the LS may decide to cipher broadcast AD only when many UEs indicate support for ciphering. For location support for many UEs over a long period (e.g. a few weeks, a few months, or a year or more), an LS may accumulate statistics on the numbers of UEs supporting broadcast of different types of AD and the numbers of UEs supporting ciphering of broadcast AD in different network areas (e.g. different cells or tracking areas) and at different times of day and different days of week. The LS may use these statistics to predict an expected usage or demand for broadcast of different types of location AD at future times and for different network areas. The LS may then broadcast the different types of AD and with or without ciphering to match this expected usage or demand in particular network areas and at particular times. The LS may also determine preferred position methods and preferred position modes (e.g. UE based versus UE assisted) to employ for a location session with any particular UE being located based on the capabilities of this particular UE for receiving broadcast AD and the types of AD currently being broadcast. For example, an LS may select a positioning method and a positioning mode that is supported by AD currently being broadcast in a network if the particular UE capabilities indicate that the particular UE is able to receive this AD via broadcast. The above techniques may improve the efficiency of both broadcast of location AD and support of location sessions with individual UEs.

Figure 3:
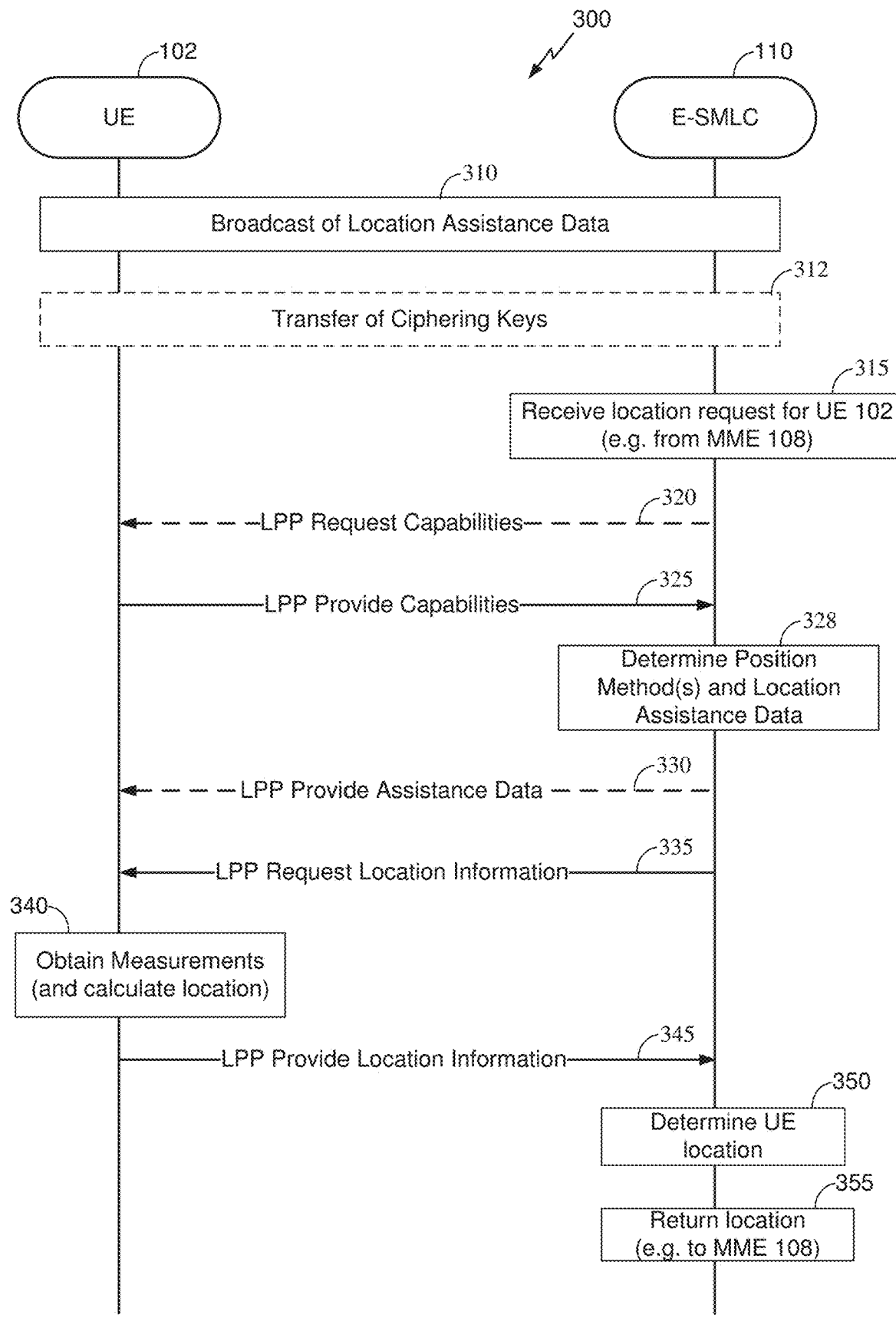

FIG. 3 shows a signaling flow 300, applicable to communication system 100 shown in FIG. 1A, illustrating communication between the UE 102 and the E-SMLC 110 that may take place in accordance with the techniques provided herein. It can be noted that here, messages are provided in accordance with the 3GPP LPP protocol as an example. However, embodiments are not so limited (e.g. NPP, NRPP, or LPP/LPPe might be used in another embodiment).

At block 310 in FIG. 3, the location assistance data is broadcast by one or more eNBs (not shown in FIG. 3) and, at optional block 312, cipher keys are transferred to UE 102 as discussed in FIG. 2.

At block 315, a location session for UE 102 may be initiated by E-SMLC 110 when E-SMLC 110 receives a location request for the UE 102, e.g., from the External Client 150 via the GMLCs 116 and 148 and MME 108.

At action 320, the E-SMLC 110 may optionally request capability information from the UE 102 by sending an LPP Request Capabilities message to the UE 102. The LPP Request Capabilities message may, in some embodiments, include information related to broadcast of location assistance data (AD) (referred to herein as location AD or just as AD). The information related to broadcast of AD may include (i) an indication that E-SMLC 110, or an associated LMF 184, supports broadcast of AD using one or more Radio Access Technologies (RATs) (e.g. NB-IoT, wideband LTE, NR, E-UTRA connected to 5GCN) which may also be indicated, and/or (ii) a request for the capabilities of UE 102 to receive broadcast AD from one or more RATs. The information related to broadcast of AD may be included as part of common Information Elements (IEs) in the LPP Request Capabilities message, as part of a positioning method IE that is dedicated to support of broadcast AD, and/or as part of IEs for positioning methods for which broadcast AD can be instigated by E-SMLC 110.

At action 325, capability information is provided by UE 102 in an LPP Provide Capabilities message sent by the UE 102 to the E-SMLC 110. The capability information may be provided by the UE 102 in response to the LPP Request Capabilities message or may be provided without a request, in which case action 320 may not occur. The LPP Provide Capabilities message may be sent from the UE 102 in accordance with the LPP protocol and may provide various location-related capabilities for the UE 102, such as capabilities to support different position methods such as A-GNSS, OTDOA, RTK, ECID, WLAN, and capabilities to support different location measurements and assistance data etc. Additionally, as discussed above, the UE 102 may indicate a level of UE support for receiving location AD via broadcast (e.g. in response to a request for the capabilities of UE 102 to receive broadcast AD that is included in the LPP Request Capabilities message). For example, the UE 102 may identify one or more of: (i) System Information Blocks (SIBs) that can be received by the UE 102 via broadcast, where the SIBs comprise one or more types of location assistance data; (ii) SIBs that can be received by the UE 102 via broadcast, where the SIBs comprise one or more types of location assistance data in ciphered form (e.g. and where the UE 102 has previously received a ciphering key to enable deciphering); (iii) types of location assistance data that can be received by the UE 102 via broadcast; (iv) types of location assistance data that can be received in ciphered form by the UE 102 via broadcast (e.g. and where the UE 102 has previously received a ciphering key to enable deciphering); (v) identifiers for one or more ciphering keys previously received by the UE 102, where the ciphering key(s) enable(s) deciphering by the UE 102 of location assistance data received via broadcast in ciphered form by the UE 102; and/or (vi) an ability by the UE 102 to receive location assistance data in ciphered form via broadcast. The UE 102 may further identify one or more Global Navigation Satellite Systems (GNSSs) for which the UE 102 can receive at least one of the types of location assistance data identified as being supported for items (i), (ii), (iii) or (iv) just described. The UE 102 may further indicate a RAT or RATs that are currently accessible (or currently available) to UE 102, and in which the SIBs and/or location AD indicated as supported by UE 102 in (i) to (vi) above are broadcast (e.g. by eNBs such as eNB 104 and eNB 106). These indications may enable E-SMLC 110 to determine which SIBs and/or which types location AD UE 102 can currently receive via broadcast.

The level of UE support for receiving location AD via broadcast that is included by UE 102 in the LPP Provide Capabilities message at action 325 (e.g. as described above) may be included as part of common IEs in the LPP Provide Capabilities message, as part of a positioning method IE that is dedicated to support of broadcast AD, and/or as part of IEs for positioning methods for which broadcast AD can be supported by UE 102.

At block 328, the E-SMLC 110 may determine one or more position methods to be used to locate the UE 102 and location assistance data to be provided point to point to the UE 102 based at least in part on the capability information received from the UE 102 at action 325 and the location assistance data that was and/or is being broadcast in block 310. Typically, the E-SMLC 110 may only determine location AD to be provided point to point when the location AD is not being broadcast or is not supported via broadcast by the UE 102. For example, the E-SMLC 110 may determine which types of AD to provide point to point to the UE 102 based on (i) the types AD and the use or non-use of ciphering of the AD that occurred or is occurring during the broadcast in block 310, and (ii) the particular types of broadcast AD and the use of AD ciphering that can or cannot be supported by the UE 102 as indicated by the UE 102 in the capabilities information from action 325. Thus, if the UE 102 indicates that it is not capable of receiving a specific type of AD via broadcast that was previously or currently is broadcast in block 310, the E-SMLC 110 may select to provide that type of AD to the UE 102 by point to point means. On the other hand, if the UE 102 indicates that it is capable of receiving specific types of AD via broadcast that were previously or currently are broadcast in block 310, the E-SMLC 110 need not provide these types of AD again to the UE 102 by point to point means, thereby reducing the amount of AD that is transmitted point to point. The E-SMLC 110 may also determine preferred position methods and preferred position modes (e.g. UE based versus UE assisted) for the UE 102 based on the capability information provided by the UE 102 for receiving broadcast location assistance data and the types of location assistance data previously or currently being broadcast.

At action 330, the E-SMLC 110 may send to the UE 102 an LPP Provide Assistance Data (PAD) message, in response to receiving the LPP Provide Capabilities message at action 325 and determining the location assistance data at block 328. The PAD message may include the AD determined in block 328. The AD provided in the LPP PAD message can be commensurate with the capabilities of the UE 102, as indicated in the LPP Provide Capabilities message. For example, if the UE 102 indicates that it is capable of obtaining location-related measurements for OTDOA, the E-SMLC 110 may provide a list of nearby cells (e.g. based on a current serving cell or serving eNB 104 for the UE 102) and information (e.g. timing, frequency, bandwidth, coding) for signals (e.g. PRS or CRS signals) transmitted within these cells by corresponding base stations (e.g. eNB 104 and eNB 106), which may enable RSTD measurements by UE 102. Similarly, if UE 102 indicates support of A-GNSS in the LPP Provide Capabilities message sent at action 325, the E-SMLC 110 may include information for visible SVs 160 in the LPP PAD message sent at action 330. The AD provided in the LPP PAD message at action 330 may omit assistance data that was or currently is broadcast by eNBs 104 and 106 (e.g., in block 310) and that UE 102 indicates at action 325 can be received by UE 102.

In some embodiments, action 330 may not occur if the AD determined in block 328 is the null set (also referred to as the "empty set"), e.g., there is no AD to be transmitted point to point because all needed assistance data was, or currently is being, broadcast (e.g. in block 310) and the UE 102 indicated in the LPP Provide Capabilities message sent at action 325 that it supports reception of broadcast messages containing the AD. In one embodiment, action 330 may be preceded by UE 102 sending an LPP Request Assistance Data message to E-SMLC 110 to request assistance data (not shown in FIG. 3). In this embodiment, UE 102 may indicate all the assistance data which UE 102 needs (e.g. whether received, or to be received, via broadcast or point to point) or only assistance data which the UE 102 needs to receive point to point (e.g. and thus omitting AD which UE 102 has received, or can later receive, via broadcast).

In one embodiment, referred to as embodiment E1, UE 102 may indicate a capability to receive one or more types of location AD by broadcast at action 325, and may either indicate that UE 102 does not have a ciphering key (or ciphering keys) to decipher the broadcast of the one or more types of location AD or indicate that UE 102 is unable to receive and decipher the broadcast of the one or more types of location AD. E-SMLC 110 may then determine at block 328 not to send the one or more types of location AD to UE 102 using LPP at action 330 and may instead determine at block 328 to send a ciphering key or ciphering keys for the one or more types of location AD to UE 102 using LPP at action 330. For example, this may enable UE 102 to receive and decipher the one or more types of location AD that may be broadcast by eNBs 104 and/or 106 (e.g. as at action 310), which may avoid E-SMLC 110 sending the one or more types of location AD to UE at action 330. This may reduce the amount of signaling at action 330 which may reduce resource usage by E-UTRAN 120 and EPC 130. With this embodiment, although UE 102 may not have a subscription to receive the ciphering key or ciphering keys at block 312 (or may not have received the ciphering key or ciphering keys for some other reason), E-SMLC 110 may avoid less efficient point to point transfer of the one or more types of location AD by sending the ciphering key or ciphering keys to UE 102 using LPP (at action 330).

At action 335, the E-SMLC 110 sends an LPP Request Location Information message to the UE 102. Here, the E-SMLC 110 may request location-related measurements (e.g. measurements for ECID, A-GNSS, OTDOA, RTK and/or WLAN). In some embodiments, the LPP Request Location Information message may request that UE 102 compute a location estimate from these measurements (e.g. if the position method is UE based OTDOA or UE based A-GNSS) and may also include a requested accuracy for any location measurements or location estimate and/or a maximum response time. In some embodiments, the LPP Request Location Information message may be a request for location information for one or more position methods determined in block 328 based on the capabilities information provided at action 325.

At block 340, the UE 102 may obtain the location information requested at action 335. The location information, for example, may be location related measurements obtained by UE 102 for RF signals transmitted by eNBs 104 and 106 and/or SVs 160. For example, location related measurements may include measurements of RSTD obtained by measuring PRS or other reference signals (e.g. CRS signals) transmitted by eNBs 104 and 106, measurements of RTT obtained by measuring signals transmitted from and/or to eNBs 104 and 106, and/or measurements of pseudorange, code phase or carrier phase obtained by measuring one or more navigation signals transmitted by each of one or more SVs 160. In some embodiments, UE 102 may also calculate a location estimate based on the obtained location measurements. The UE 102 may use AD broadcast by eNBs 104 and 106 (at block 310) that UE 102 was able to receive, decode (and possibly decipher) and/or AD received at action 330 to help obtain the location measurements and/or determine any location estimate.

At action 345, information indicative of the location information obtained at block 340 (e.g. a location estimate or the location measurements) is sent to the E-SMLC 110 by the UE 102 in an LPP Provide Location Information message.

At block 350, the E-SMLC 110 can use the location information received at action 345 (comprising one or more location-related measurements or a location estimate) to determine (e.g. calculate or verify) an estimated location of the UE 102. The determined location estimate (and any accompanying uncertainty or expected error, if determined) may then be returned to the requesting entity at block 355 (e.g. can be returned to external client 150 via MME 108 and GMLCs 116 and 148).

Figure 4:
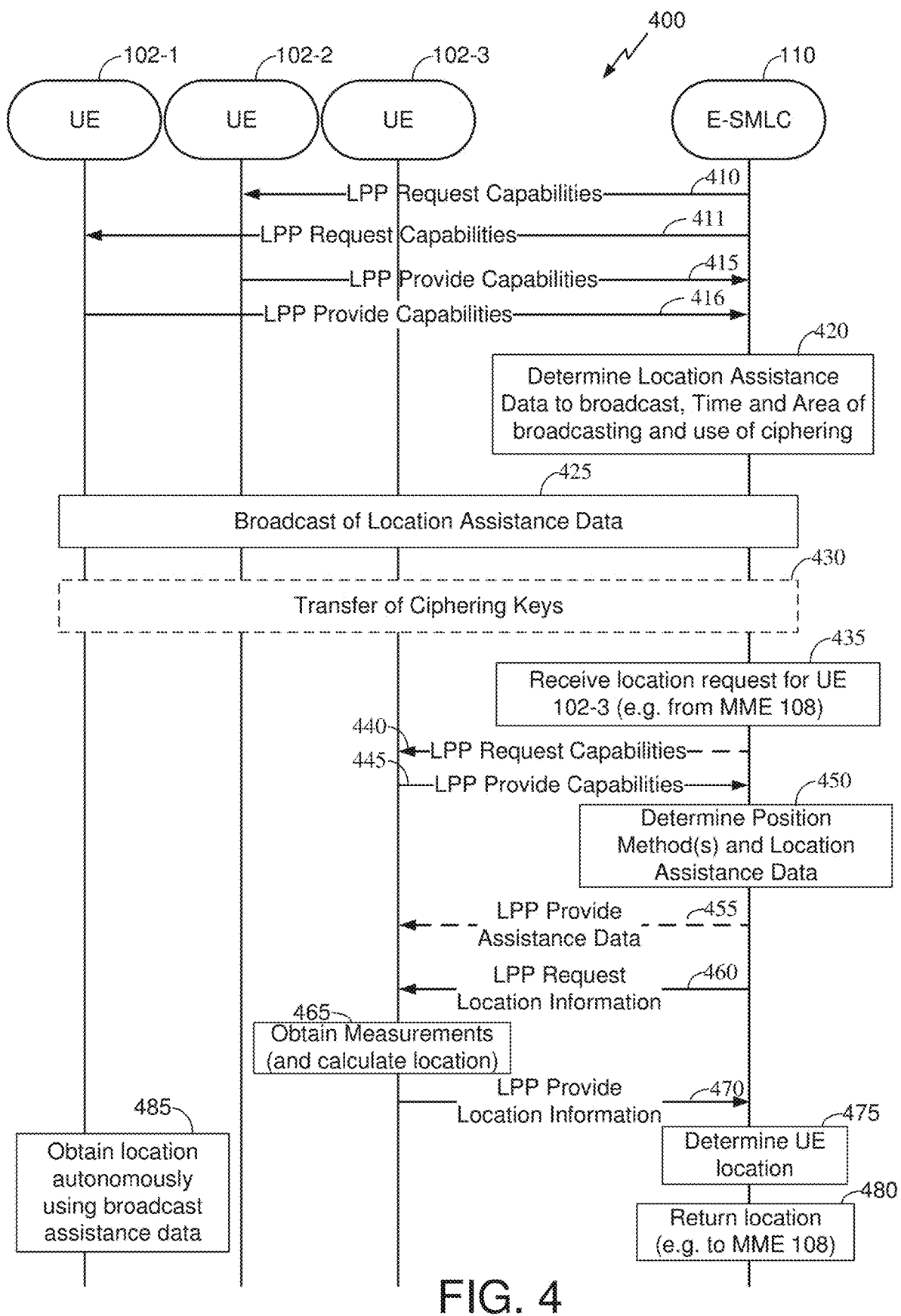

FIG. 4 shows a signaling flow 400, applicable to communication system 100 shown in FIG. 1A, illustrating communication between a plurality of UEs, indicated by UE 102-1, UE 102-2, and UE 102-3 (sometimes collectively referred to as UEs 102) and the E-SMLC 110 that may take place in accordance with the techniques provided herein. In signaling flow 100, UEs 102-1, 102-2 and 102-3 may represent a large number of UEs 102 (e.g. hundreds, thousands or millions) even though, for simplicity, only three of these UEs are shown in FIG. 4. It can be noted that here, messages are provided in accordance with the 3GPP LPP protocol as an example. However, embodiments are not so limited (e.g. NPP, NRPP or LPP/LPPe might be used in another embodiment).

At actions 410 and 411 in FIG. 4, the E-SMLC 110 may optionally request capability information from some or all of the plurality of UEs 102 by sending an LPP Request Capabilities message to each of the plurality of UEs 102.

At actions 415 and 416, capability information is provided by each of the plurality of UEs 102 (UEs 102-1 and 102-2 in FIG. 4) in an LPP Provide Capabilities message sent by each of the UEs 102-1 and 102-12 to the E-SMLC 110. Actions 410 and 415 and actions 411 and 416 may correspond to actions 320 and 325 in FIG. 3, and may be performed while E-SMLC 110 has a location session with each of the plurality of UEs 102. It should be understood that while FIG. 4 illustrates two UEs providing capability information, capability information, in fact, may be provided to E-SMLC 110 by many more UEs, e.g., hundreds or thousands of UEs. Moreover, the UEs 102-1 and 102-2 may be located in different areas, e.g., within different cells and/or different Tracking Areas and/or may send the capability information at different times. Further, it should be understood that the capability information may be provided by the UEs 102-1 and 102-2 over a long period of time, e.g., days, weeks, months or longer. The capability information from the UEs 102-1 and 102-2, by way of example, may be received during individual location sessions with each UE 102. The capability information may be provided by the plurality of UEs 102 in response to the LPP Request Capabilities messages or may be provided without requests, in which case one or more of actions 410 and 411 may not occur. The plurality of UEs 102 may provide capability information in accordance with the LPP protocol by providing various location-related capabilities, such as capabilities to support different position methods such as A-GNSS, OTDOA, RTK, ECID and WLAN, and capabilities to support different location measurements and assistance data etc. Additionally, as discussed above, each UE 102 may indicate its level of UE support for receiving location AD via broadcast. For example, each UE 102 may identify: (i) System Information Blocks (SIBs) that can be received and decoded by the UE 102 via broadcast, where the SIBs comprise first types of location assistance data; (ii) SIBs that can be received by the UE 102 via broadcast, where the SIBs comprise second types of location assistance data in ciphered form; (iii) third types of location assistance data that can be received by the UE 102 via broadcast; (iv) fourth types of location assistance data that can be received in ciphered form by the UE 102 via broadcast; (v) an indication or identification of at least one ciphering key previously received by the UE 102, where the at least one ciphering key enables deciphering by the UE 102 of location assistance data received in ciphered form by the UE 102 via broadcast; (vi) an ability by the UE 102 to receive location assistance data in ciphered form via broadcast; or (vii) some combination of the above. Each UE 102 in the plurality of UEs 102 may further identify one or more GNSSs for which the UE 102 can receive at least one of the first types of location assistance data, the second types of location assistance data, the third types of location assistance data or the fourth types of location assistance data.

At block 420, the E-SMLC 110 uses the capability information provided by the plurality of UEs 102 to determine location assistance data to be broadcast by eNBs 104 and 106 in different areas (e.g., cells and/or Tracking Areas) at different times. Moreover, the E-SMLC 110 may use the capability information provided by the plurality of UEs 102 to determine whether to broadcast location assistance data in ciphered form. For example, the E-SMLC 110 may select different types of location assistance data to be broadcast based on a minimum threshold number or a minimum threshold proportion of UEs 102 in the plurality of UEs 102 indicating support for receiving certain types of location assistance data via broadcast. Thus, if the number or the proportion of UEs 102 in a particular area at a particular time of day and/or day of the week indicating support for receiving a type of location assistance data via broadcast is greater than a predetermined minimum threshold number or minimum threshold proportion, the E-SMLC 110 may select that type of location assistance data to be broadcast in that particular area and during that particular time of day and/or day of the week. The E-SMLC 110 may further determine to use ciphering for at least a portion of the types of location assistance data to be broadcast based on a minimum threshold number or a minimum threshold proportion of UEs 102 in the plurality of UEs 102 indicating the capability to receive and decipher this portion of the types of location assistance data. By way of example, the E-SMLC 110 may accumulate statistics on the capability information provided by the plurality of UEs 102 from the different areas and over time. The E-SMLC 110 may predict an expected usage, an expected demand and/or an expected level of support by UEs 102 for different types of location assistance data and ciphering of the location assistance data at different times, e.g., at different times of day and different days of week, in the different areas using the accumulated statistics. The E-SMLC 110 may select the types of location assistance data to be broadcast, and whether some or all of the assistance data is to be ciphered, in different areas and at different times based on the expected usage or expected demand.

At block 425, the E-SMLC 110 provides the location assistance data, selected at block 420 to be broadcast, to the eNB 104 and eNB 106, which broadcast the location assistance data as discussed in FIG. 2. At optional block 430, if some or all of the location assistance data broadcast at block 425 is ciphered, the cipher keys are transferred to one or more of the UEs 102 as discussed in FIG. 2. Thus, the E-SMLC 110 may send different sets of location assistance data including the different types of location assistance data to be broadcast at the different times to base stations in the different areas for broadcasting and the base stations broadcast the location assistance data at the appropriate times.

Blocks and actions 435 to 480 are consistent with, and may correspond to, the blocks and actions 315 to 355 described previously for FIG. 3, for performing a location session with UE 102-3. In this example, the location AD broadcast at block 425 and any ciphering keys transferred at block 430 are used to assist location of UE 102-3 by allowing E-SMLC 110 not to send this AD (by point to point means) at action 455 if the capability information received from UE 102-3 at action 445 indicates that UE 102-3 is able to receive, decode (and decipher) this broadcast AD. The capability information received from UE 102-3 at action 445 may also be used by E-SMLC 110, e.g., along with the capability information received from UEs 102-1 and 102-3, to determine location assistance data and ciphering for future broadcasting at block 425.

As illustrated by block 485, a UE 102-1 (or any other UE 102) may autonomously obtain location information, such as location related measurements and/or a location estimate, using the location assistance data that is broadcast at block 425 (e.g. using ciphering keys provided at block 430 if necessary). Thus, where the location assistance data broadcast at block 425 includes all needed assistance data, the UE 102-1 may obtain location information without entering a location session with E-SMLC 110 and possibly without attaching to, or entering into a connected state with, E-UTRAN 120 and EPC 130.

Figure 5A:
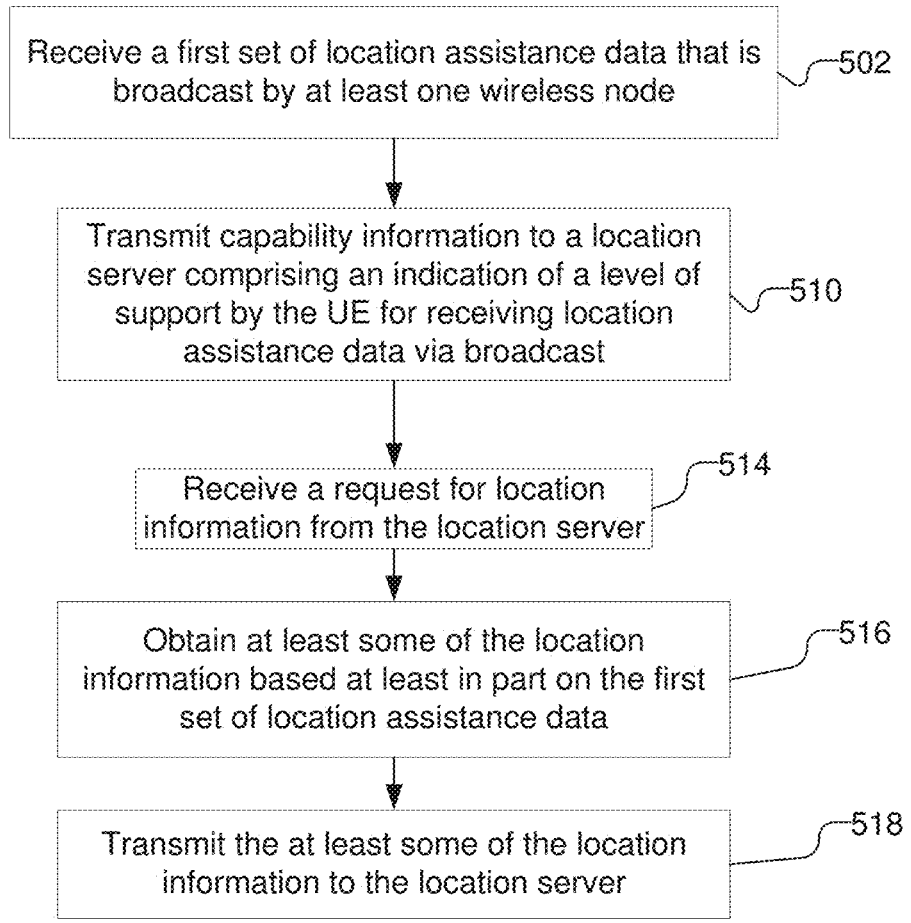
FIGS. 5A and 5B are flow diagrams of procedures that may performed at a mobile device to support the techniques described herein.

FIG. 5A shows a process flow illustrating a method of obtaining location information performed by a user equipment (UE), such as UE 102. As illustrated, at block 502, the UE receives a first set of location assistance data that is broadcast by at least one wireless node, e.g. as described for stage 3 of FIG. 2, block 310 of FIG. 3 and block 425 of FIG. 4. The wireless node, for example, may be an evolved Node B (e.g. eNB 104 or eNB 106), a next generation eNB (ng-eNB), a New Radio (NR) Node B (e.g. a gNB 111) or an IEEE 802.11 WiFi access point, or a combination thereof.

At block 510, the UE transmits capability information to a location server, such as E-SMLC 110, H-SLP 118 or LMF 184, e.g. as described for action 325 in FIG. 3. The capability information includes an indication of a level of support by the UE for receiving location assistance data via broadcast.

The indication of the level of support by the UE for receiving location assistance data via broadcast may include, for example: an identification of first System Information Blocks (SIBs) that can be received by the UE via broadcast, where the first SIBs comprise first types of location assistance data; an identification of second SIBs that can be received by the UE via broadcast, where the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, where the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, where the UE currently has access to the at least one RAT; or some combination of the foregoing. In some aspects, the first set of location assistance data may comprise fifth types of location assistance data that are included within one or more of the first, second, third, and fourth types of location assistance data (e.g. which may enable the UE to indicate to the location server that some or all of the first set of location assistance data can be received by the UE). In an aspect, at least one of the first, second, third, and fourth types of location assistance data may be assistance data for at least one position method, such as UE assisted or UE based Assisted Global Navigation Satellite System (A-GNSS), UE assisted or UE based Observed Time Difference of Arrival (OTDOA), UE assisted or UE based Wireless Local Area Network (WLAN), UE assisted or UE based Enhanced Cell ID (ECID), UE assisted or UE based Real Time Kinematics (RTK), UE assisted or UE based Precise Point Positioning (PPP), or Differential GNSS (DGNSS), or a combination thereof. In an aspect, the indication of the level of UE support for receiving location assistance data via broadcast may additionally include an identification of at least one Global Navigation Satellite System (GNSS) for which the UE can receive at least one of the first, second, third or fourth types of location assistance data.

At block 514, the UE receives a request for location information from the location server, e.g. as described for action 335 for FIG. 3. At block 516, the UE obtains at least some of the location information based at least in part on the first set of location assistance data, e.g. as described for block 340 for FIG. 3. At block 518, the UE transmits the at least some of the location information to the location server, e.g. as described for action 345 for FIG. 3. The location information, by way of example, may include: (i) location measurements, such as measurements of RSTD obtained by measuring PRS or other reference signals (e.g. CRS signals) transmitted by eNBs 104 and 106, measurements of RTT obtained by measuring signals transmitted from and/or to eNBs 104 and 106, and/or measurements of pseudorange, code phase or carrier phase obtained by measuring one or more navigation signals transmitted by each of one or more SVs 160; and/or (ii) a location estimate determined by the UE based on obtained location measurements. The location information requested by the location server in block 514, may be determined by the location server based at least in part on the capability information provided by the UE in block 510.

Figure 5B:
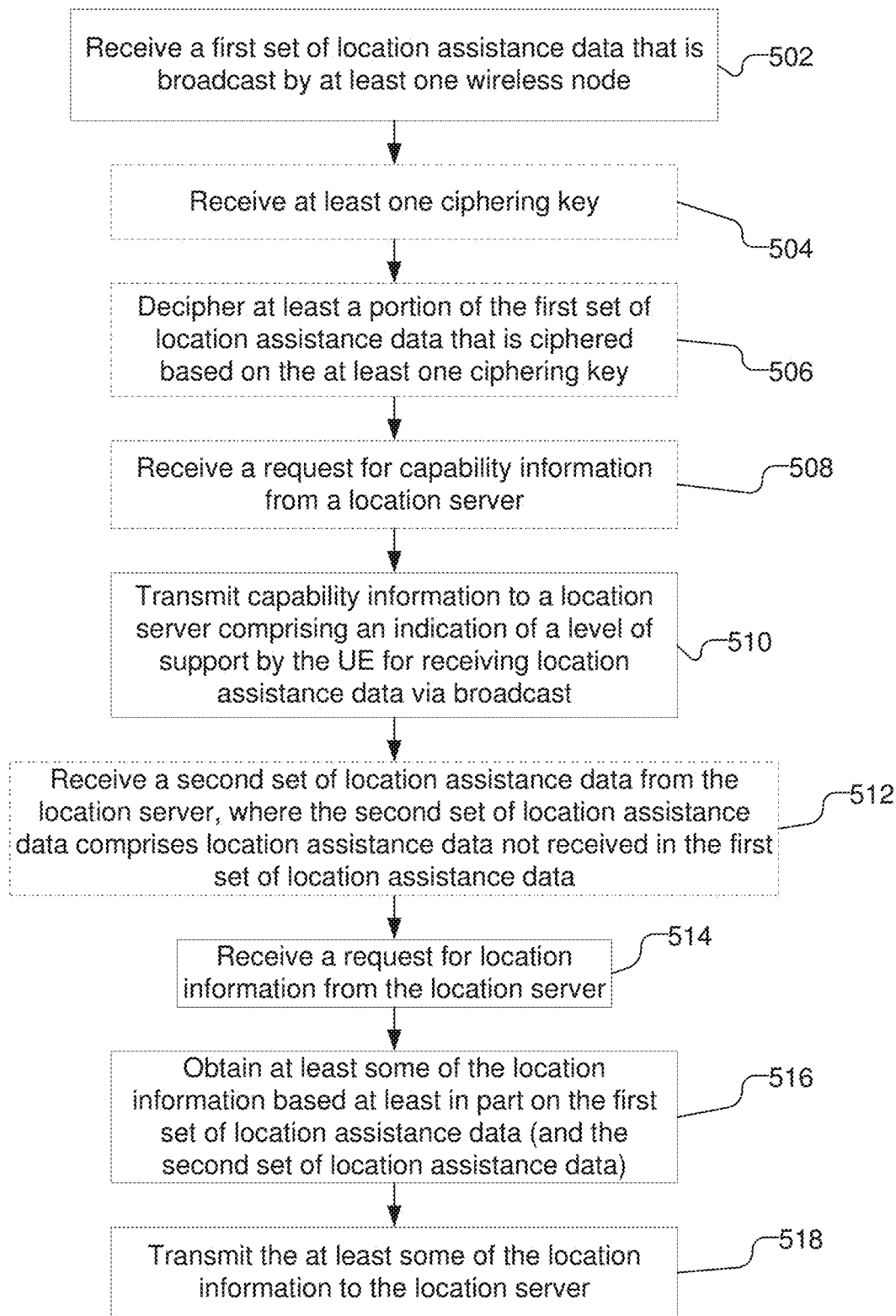

FIG. 5B shows another process flow illustrating a method of obtaining location information performed by a user equipment (UE), such as UE 102, which is similar to the process flow illustrated in FIG. 5A, with like designated elements being the same unless otherwise stated. FIG. 5B illustrates additional optional actions with boxes having broken lines. For example, optionally, at least a portion of the first set of location assistance data received at block 502 may be ciphered, in which case, the UE may receive at least one ciphering key at block 504 (e.g. as described for stage 5 of FIG. 2) and may decipher the at least a portion of the first set of location assistance data received at block 502 based on the at least one ciphering key at block 506. As illustrated by the broken lines in FIG. 5B, the receipt of at least one ciphering key at block 504 and the deciphering of the location assistance data at block 506 are optional and may only be performed if the UE is capable of receiving ciphered broadcast location assistance data and at least a portion of the first set of location assistance data is broadcast in ciphered form. For example, the ciphering may use the 128-bit Advanced Encryption Standard (AES) algorithm defined by the National Institute of Standards and Technology (NIST) in the United States. For example, AES counter mode may be used.

Prior to block 510, where the UE transmits capability information to a location server, as illustrated with block 508, the UE may receive a request for capability information from the location server (e.g. as at action 320 in FIG. 3), where the capability information is transmitted at block 510 in response to receipt of the request.

Additionally, as illustrated by optional block 512, the UE may receive a second set of location assistance data from the location server, where the second set of location assistance data comprises location assistance data not received in the first set of location assistance data. For example, block 512 may correspond to action 330 in FIG. 3. The second set of location assistance data is not broadcast, but is sent point to point (e.g. using LPP, LPP/LPPe, NPP or NRPP). The second set of location assistance data, for example, may be determined by the location server based at least in part on the capability information provided by the UE at block 510 (e.g. as at block 328 in FIG. 3). In one aspect, the second set of location assistance data may comprise at least one ciphering key, where at least a portion of the first set of location assistance data is ciphered, and the UE may decipher the at least a portion of the first set of location assistance data based on the at least one ciphering key, e.g. as described previously for embodiment E1 for FIG. 3. For example, this aspect may avoid including the at least a portion of the first set of location assistance data in the second set of location assistance data, which may reduce signaling and other resource usage by the location server and other elements in a wireless network (e.g. E-UTRAN 120 and EPC 130), as described for embodiment E1 for FIG. 3.

At block 516, the UE obtains at least some of the location information based at least in part on the first set of location assistance data, e.g. as described for block 340 for FIG. 3. In addition, and different from FIG. 5A, where the UE receives the second set of location assistance data in block 512, the UE may obtain at least some of the location information at block 516 based at least in part on the first set of location assistance data and the second set of location assistance data. Other aspects of the process flow in FIG. 5B are as described for FIG. 5A.

Figure 6A:
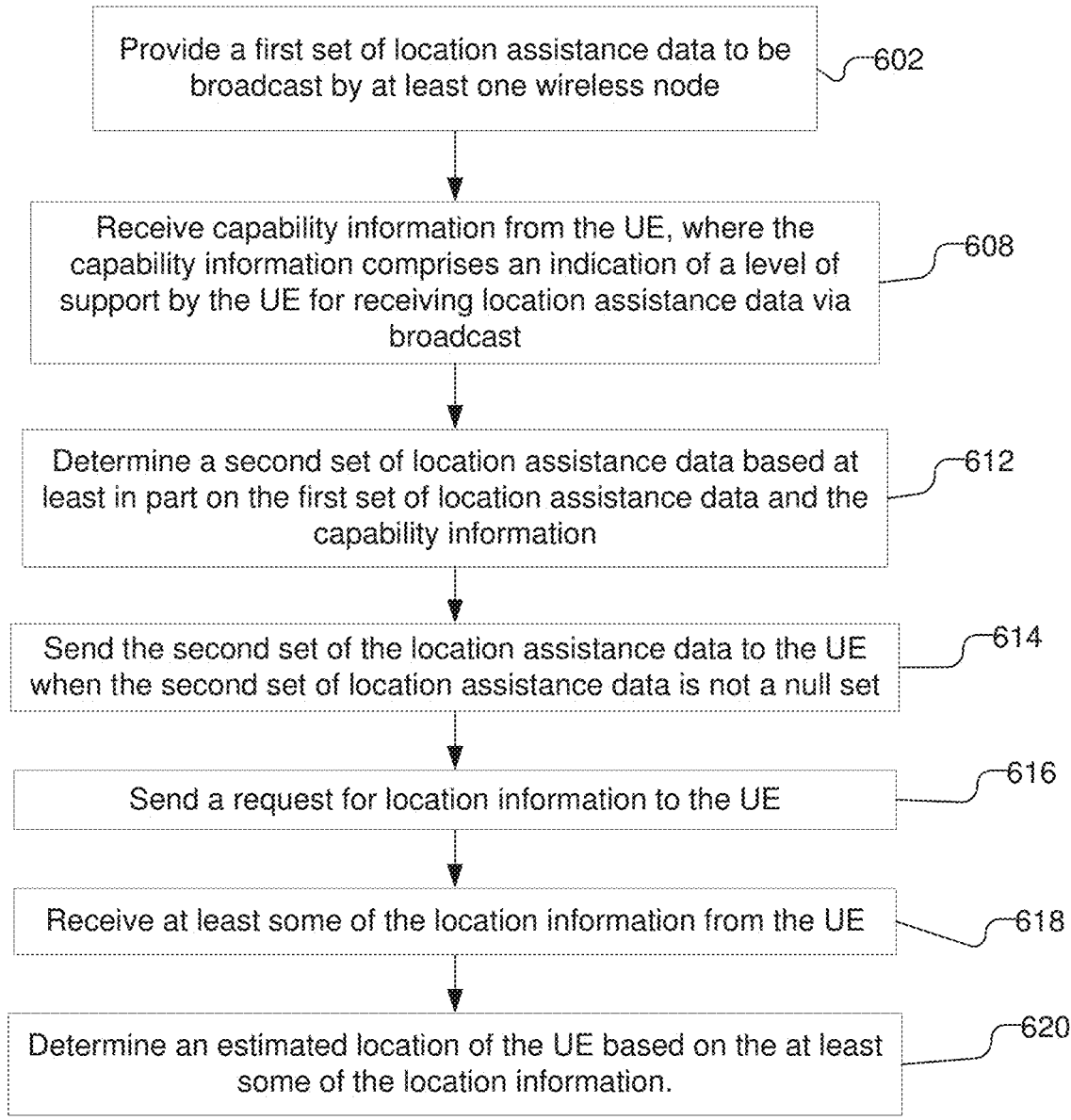
FIGS. 6A, 6B and 7A, 7B are flow diagrams of procedures that may performed at a location server to support the techniques described herein.

FIG. 6A shows a process flow illustrating a method of obtaining a location of a user equipment (UE), such as UE 102, performed by a location server, such as E-SMLC 110, H-SLP 118 or LMF 184. As illustrated, at block 602, the location server provides a first set of location assistance data to be broadcast by at least one wireless node, e.g. as described for FIG. 2. The wireless node, for example, may be an evolved Node B (e.g. eNB 104 or eNB 106), a next generation eNB (ng-eNB), a New Radio (NR) Node B (e.g. a gNB 111) or an IEEE 802.11 WiFi access point, or a combination thereof.

At block 608, the location server may receive capability information from the UE. The capability information may include an indication of a level of support by the UE for receiving location assistance data via broadcast.

The indication of the level of support by the UE for receiving location assistance data via broadcast may include, for example: an identification of first System Information Blocks (SIBs) that can be received by the UE via broadcast, where the first SIBs comprise first types of location assistance data; an identification of second SIBs that can be received by the UE via broadcast, where the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, where the at least one ciphering key enables deciphering by the UE of location assistance data received in ciphered form by the UE via broadcast (e.g. location assistance data provided at block 602); an indication of an ability by the UE to receive location assistance data in ciphered form via broadcast; an indication of at least one Radio Access Technology (RAT) in which location assistance data is broadcast (e.g. due to block 602), where the UE currently has access to the at least one RAT; or some combination of the foregoing. The one or more of the first, second, third, and fourth types of location assistance data may be assistance data for at least one position method, such as UE assisted or UE based Assisted Global Navigation Satellite System (A-GNSS), UE assisted or UE based Observed Time Difference of Arrival (OT-DOA), UE assisted or UE based Wireless Local Area Network (WLAN), UE assisted or UE based Enhanced Cell ID (ECID), UE assisted or UE based Real Time Kinematics (RTK), UE assisted or UE based Precise Point Positioning (PPP), or Differential GNSS (DGNSS), or a combination thereof. The indication of the level of support by the UE for receiving location assistance data via broadcast may additionally include an identification of at least one Global Navigation Satellite System (GNSS) for which the UE can receive at least one of the first, second, third or fourth types of location assistance data.

At block 612, the location server determines a second set of location assistance data based at least in part on the first set of location assistance data and the capability information, e.g. as described for block 328 in FIG. 3. For example, the location server may determine the second set of location assistance data based on the types of location assistance data in the first set of location assistance data, whether some or all of the first set of location assistance data was ciphered, the capability of the UE to receive these types of location assistance data via broadcast and/or the UE's capability to decipher the location assistance data. Thus, if the UE indicates that it is not capable of receiving via broadcast a specific type of location assistance data that was included in the first set of location assistance data, the location server may determine to include this specific type of location assistance data in the second set of location assistance data. Conversely, if the UE indicates that it is capable of receiving via broadcast a specific type of location assistance data that was included in the first set of location assistance data, the location server may exclude this specific type of location assistance data from the second set of location assistance data. For example, the first set of location assistance data may include fifth types of location assistance data, in which case the second set of location assistance data may exclude types of location assistance data that are included in both the fifth types of location assistance data and at least one of the first, second, third, and fourth types of location assistance data. The first set of location assistance data, for example, may include a third set of location assistance data for the at least one GNSS discussed previously in connection with block 608, and the second set of location assistance data may then exclude the third set of location assistance data. In one aspect, at least a portion of the first set of location assistance data is ciphered. In this aspect, the second set of location assistance data may exclude at least some of the ciphered location assistance data (from the portion of the first set of location assistance data that is ciphered). For example, this exclusion may occur when the indication of the level of support by the UE for receiving location assistance data via broadcast comprises (i) the indication of the ability by the UE to receive location assistance data in ciphered form via broadcast, and/or (ii) the identification of the at least one ciphering key previously received by the UE (e.g. where the at least some of the ciphered location assistance data is ciphered using the at least one ciphering key). In this aspect, when the at least some of the ciphered location assistance data (from the portion of the first set of location assistance data that is ciphered) is ciphered using at least one ciphering key and the indication of the level of support by the UE for receiving location assistance data via broadcast excludes an indication of the UE having the at least one ciphering key, the location server may include the at least one ciphering key in the second set of location assistance data, e.g. as described for embodiment E1 for FIG. 3. For example, this embodiment may avoid including the at least some of the ciphered location assistance data (from the portion of the first set of location assistance data that is ciphered) in the second set of location assistance data, which may reduce signaling and other resource usage by the location server and other elements in a wireless network (e.g. E-UTRAN 120 and EPC 130), as described for embodiment E1 for FIG. 3. The location server may determine, for example, that all needed location assistance data was included in the first set of location assistance data and that the UE is capable of receiving all needed location assistance data via broadcast from the first set of location assistance data, in which case the second set of location assistance data is a null set, i.e., it includes no location assistance data.

At block 614, the location server sends the second set of location assistance data to the UE when the second set of location assistance data is not a null set, e.g. as at action 330 for FIG. 3. In other words, when there is some location assistance data in the second set of location assistance data, the second set of location assistance data is sent to the UE. The second set of location assistance data is not broadcast, but is sent point to point (e.g. using LPP, LPP/LPPe, NPP or NRPP).

At block 616, the location server sends a request for location information to the UE, e.g. as at action 335 for FIG. 3. The location information requested by the location server (e.g. the content of the request for location information) may be determined by the location server based at least in part on the first set of location assistance data and the capability information provided by the UE.

At block 618, the location server receives at least some of the location information (that was requested at block 616) from the UE. The at least some of the location information may be obtained by the UE based at least in part on the first set of location assistance data and the second set of location assistance data. The location information requested at block 616 and the at least some of the location information received at block 618, by way of example, may each include: (i) location measurements, such as measurements of RSTD obtained by measuring PRS or other reference signals (e.g. CRS signals) transmitted by eNBs 104 and 106, measurements of RTT obtained by measuring signals transmitted from and/or to eNBs 104 and 106, and/or measurements of pseudorange, code phase or carrier phase obtained by measuring one or more navigation signals transmitted by each of one or more SVs 160; and/or (ii) a location estimate determined by the UE based on obtained location measurements. At block 620, the location server determines an estimated location of the UE based on the at least some of the location information.

In another aspect, the process flow shown in FIG. 6 may further include receiving capability information from a plurality of UEs (e.g. UEs 102), where the capability information received from each UE in the plurality of UEs includes an indication of the level of UE support for receiving location assistance data via broadcast (e.g. as described for actions 415 and 416 in FIG. 4). The location server may then determine the first set of location assistance data based at least in part on the capability information received from the plurality of UEs (e.g. as described for block 420 in FIG. 4). In this further aspect, the capability information may be received from the plurality of UEs at a first set of times (e.g. at different times of day and/or days of week), where the plurality of UEs are in a first set of areas, and the process may then further include determining a second set of times and a second set of areas, based on the first set of times and the first set of areas, and providing the first set of location assistance data to be broadcast at block 602 at at least one time of the second set of times and in at least one area of the second set of areas. For example, the first set of location assistance data may then be broadcast by the at least one wireless node in the at least one area and at the at least one time. In this aspect, the first set of areas and the second set of areas may each comprise a set of cells, a set of Tracking Areas or a set of cells and a set of Tracking Areas.

Figure 6B:
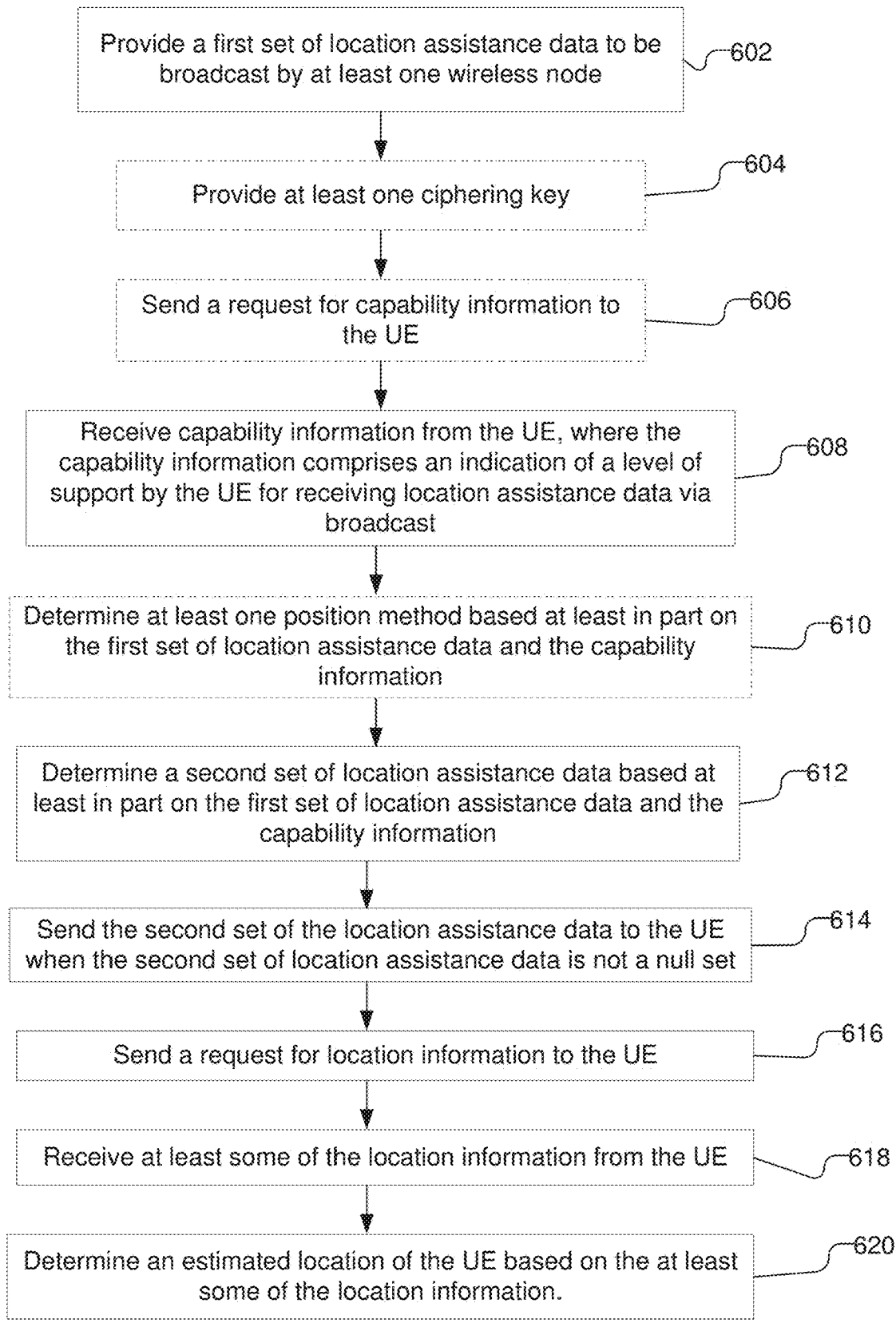

FIG. 6B shows another process flow illustrating a method of obtaining a location of a user equipment (UE), such as UE 102, performed at a location server (e.g. E-SMLC 110, H-SLP 118 or LMF 184), which is similar to the process flow illustrated in FIG. 6A, with like designated elements being the same unless otherwise stated.

FIG. 6B illustrates additional optional actions with boxes having broken lines. For example, optionally, as illustrated at block 604, the location server may provide at least one ciphering key to the UE, where at least a portion of the first set of location assistance data provided at block 602 is ciphered, and may be deciphered by the UE using the at least one ciphering key. The at least one ciphering key may be transferred by the location server to the UE via an MME or AMF (e.g. MME 108 or AMF 182), e.g. as described for stage 4 and stage 5 of FIG. 2. For example, the ciphering of the at least a portion of the first set of location assistance data may use the 128-bit Advanced Encryption Standard (AES) algorithm defined by the National Institute of Standards and Technology (NIST) in the United States. For example, AES counter mode may be used.

Prior to block 608, where the location server may receive capability information from the UE, as illustrated with block 606, the location server may send a request for capability information to the UE, where the capability information is transmitted by the UE in response to receipt of the request.

At block 608, where the location server may receive capability information from the UE including an indication of a level of support by the UE for receiving location assistance data via broadcast, the indication of the level of support by the UE for receiving location assistance data via broadcast may include an identification of at least one ciphering key previously received by the UE, where the ciphering key may be as provided at block 604.

Additionally, as illustrated by optional block 610, the location server may determine at least one position method based at least in part on the first set of location assistance data provided at block 602 and the capability information received at block 608. For example, block 610 may correspond to part of block 328 for FIG. 3.

At block 612, where the location server determines the second set of location assistance data based at least in part on the first set of location assistance data and the capability information, and different from FIG. 6A, the location server may determine the second set of location assistance data based, at least in part, on the at least one position method determined at block 610, when block 610 is performed.

At block 616, where the location server sends a request for location information to the UE, and different from FIG. 6A, the request for location information may comprise or include a request for location information for the at least one position method determined at block 610, when block 610 is performed. Other aspects of the process flow in FIG. 6B are as described for FIG. 6A.

Figure 7A:
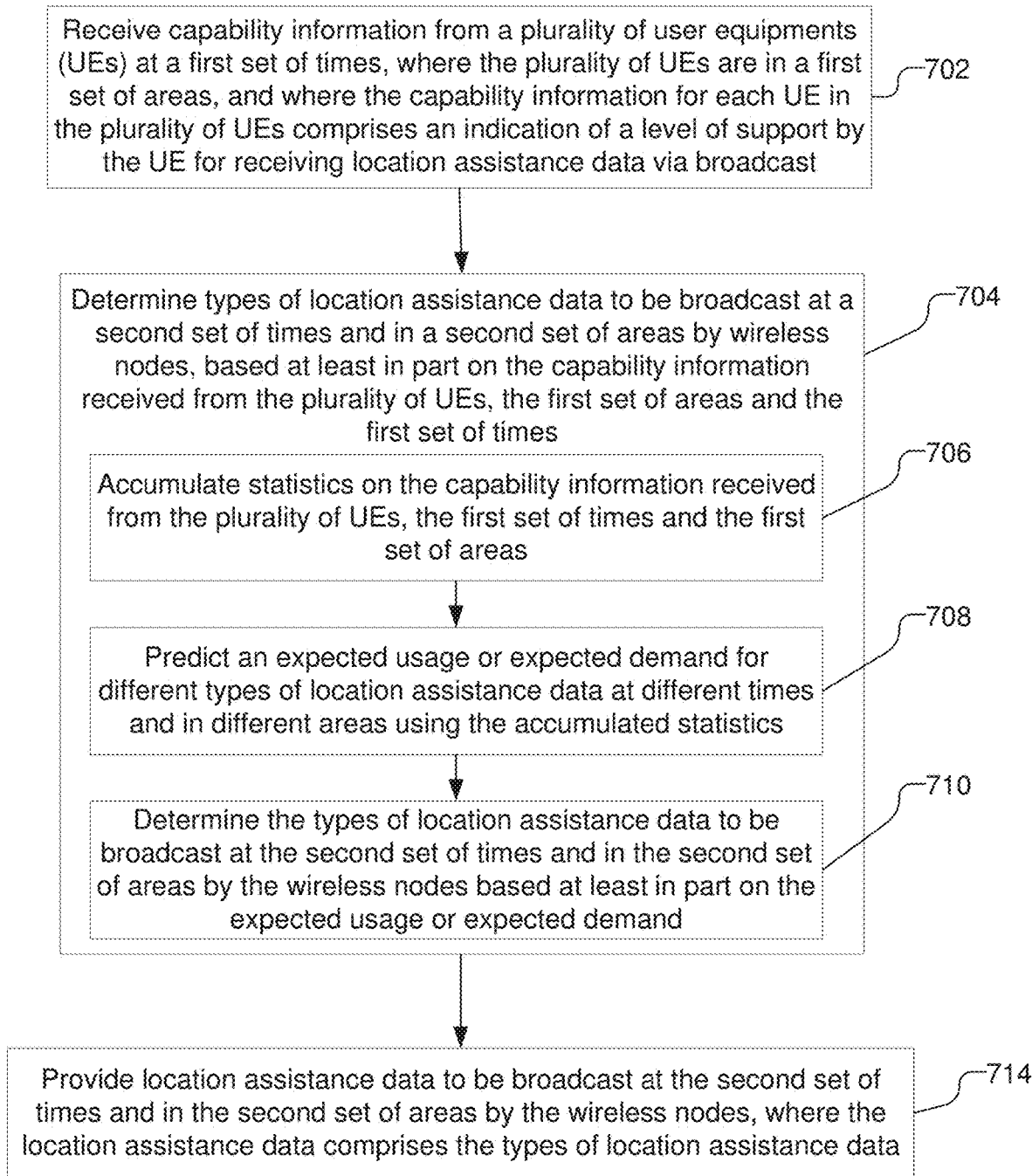

FIG. 7A shows a process flow illustrating a method of providing location assistance data by a location server, such as E-SMLC 110, H-SLP 118 or LMF 184. The process flow of FIG. 7A may be used, e.g., by a location server to generate and provide the first set of location assistance data to be broadcast by the at least one wireless node in block 602 of FIG. 6A or 6B.

As illustrated, at block 702, the location server receives capability information from a plurality of user equipments (UEs) such as UEs 102. The capability information, for example, may be received while the location server has, or is in, a location session with each UE in the plurality of UEs, as in the example in FIG. 3 and as possible for actions 415 and 416 of FIG. 4. The capability information may instead or in addition be obtained from subscription and/or capability information for UEs (e.g. UEs 102) stored in a home network HSS or UDM (e.g. HSS 145 or UDM 188). The capability information may be received at a first set of times and the plurality of UEs may then be in a first set of areas. For example, the first set of times may be over a period of time and may include different times of day and/or different days of week. The first set of areas may include, for example, different cells and/or different Tracking Areas for LTE and/or NR wireless access. The capability information received for each UE in the plurality of UEs may include an indication of a level of support by the UE for receiving location assistance data via broadcast.

The indication of the level of support by the UE for receiving location assistance data via broadcast (received at block 702) may include, for example: an identification of first System Information Blocks (SIBs) that can be received by the UE via broadcast, where the first SIBs comprise first types of location assistance data; an identification of second SIB s that can be received by the UE via broadcast, where the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, where the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, where the UE currently has access to the at least one RAT; or some combination of the foregoing. At least one of the first, second, third, and fourth types of location assistance data may be assistance data for at least one position method, such as UE assisted or UE based Assisted Global Navigation Satellite System (A-GNSS), UE assisted or UE based Observed Time Difference of Arrival (OTDOA), UE assisted or UE based Wireless Local Area Network (WLAN also referred to as WiFi or Wi-Fi), UE assisted or UE based Enhanced Cell ID (ECID), UE assisted or UE based Real Time Kinematics (RTK), UE assisted or UE based Precise Point Positioning (PPP), or Differential GNSS (DGNSS), or a combination thereof. The indication of the level of support by the UE for receiving location assistance data via broadcast may additionally include an identification of at least one Global Navigation Satellite System (GNSS) for which the UE can receive at least one of the first, second, third or fourth types of location assistance data.

At block 704, the location server determines types of location assistance data to be broadcast at a second set of times and in a second set of areas by wireless nodes, based at least in part on the capability information received from the plurality of UEs, the first set of areas and the first set of times. For example, block 704 may correspond to block 420 in FIG. 4. The wireless nodes, for example, may include at least one of an evolved Node B (e.g. eNB 104 or eNB 106), a next generation eNB (ng-eNB), a New Radio (NR) Node B (e.g. a gNB 111), an IEEE 802.11 WiFi access point, or a combination thereof. The second set of areas may include areas that are in the first set of areas. For example, the first set of areas and the second set of areas may each comprise or include a set of cells and/or a set of Tracking Areas. The second set of times may include times that are in the first set of times, where the first set of times and the second set of times may each be times of day and/or days of week. By way of example, the types of location assistance data to be broadcast at the second set of times and in the second set of areas may be determined by determining types of location assistance data included within one or more of the first, second, third, and fourth types of location assistance data for at least a minimum threshold number or a minimum threshold proportion of UEs in the plurality of UEs. By way of example, the types of location assistance data to be broadcast may be determined at block 706 by the location server by accumulating statistics on the capability information received from the plurality of UEs, the first set of times and the first set of areas. An expected usage or expected demand (by UEs) for different types of location assistance data at different times and in different areas may be predicted at block 708 using the accumulated statistics. The types of location assistance data to be broadcast at the second set of times and in the second set of areas by the wireless nodes may be determined at block 710 based at least in part on the expected usage or expected demand.

At block 714, the location server may provide location assistance data to be broadcast at the second set of times and in the second set of areas by the wireless nodes, where the location assistance data comprises the types of location assistance data determined at block 704 (e.g. as described for block 425 in FIG. 4 and for the process flow in FIG. 6A or 6B).

Figure 7B:
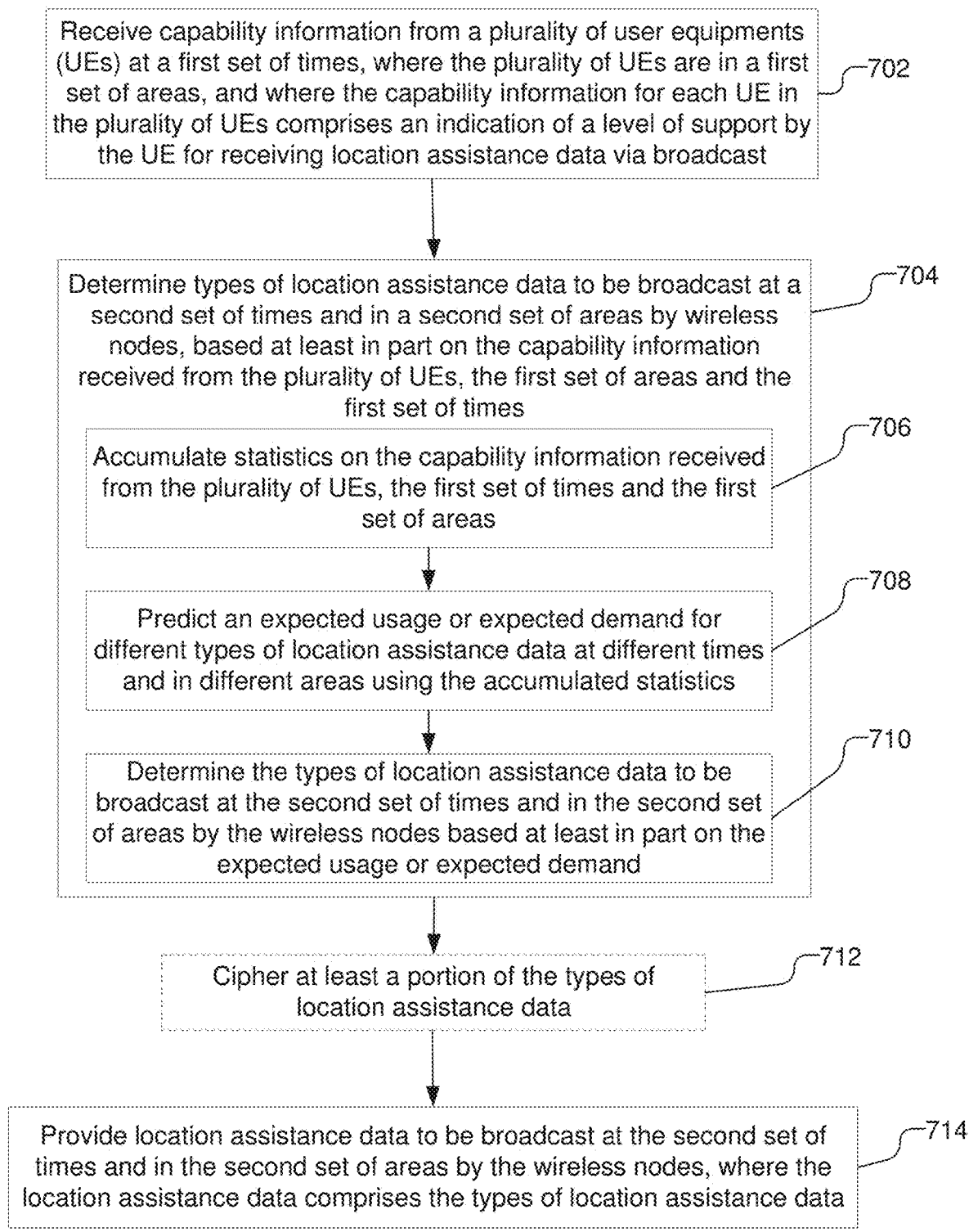

FIG. 7B shows another process flow illustrating a method of providing location assistance data by a location server, such as E-SMLC 110, H-SLP 118 or LMF 184, which is similar to the process flow illustrated in FIG. 7A, where like designated elements are the same. FIG. 7B illustrates optional actions with boxes having broken lines. The process flow of FIG. 7B may be used, e.g., by a location server to generate and provide the first set of location assistance data to be broadcast by the at least one wireless node in block 602 of FIG. 6A or 6B.

As illustrated prior to block 714, where the location server may provide location assistance data to be broadcast at the second set of times and in the second set of areas by the wireless nodes, optionally, the location server may cipher at least a portion of the types of location assistance data at block 712 (prior to broadcast). For example, block 714 may be performed when the capability information received from the plurality of UEs at block 702 indicates a capability to receive and decipher the at least a portion of the types of location assistance data by at least a minimum threshold number of UEs or a minimum threshold proportion of UEs in the plurality of UEs. Other aspects of the process flow in FIG. 7B are as described for FIG. 7A.

Figure 8:
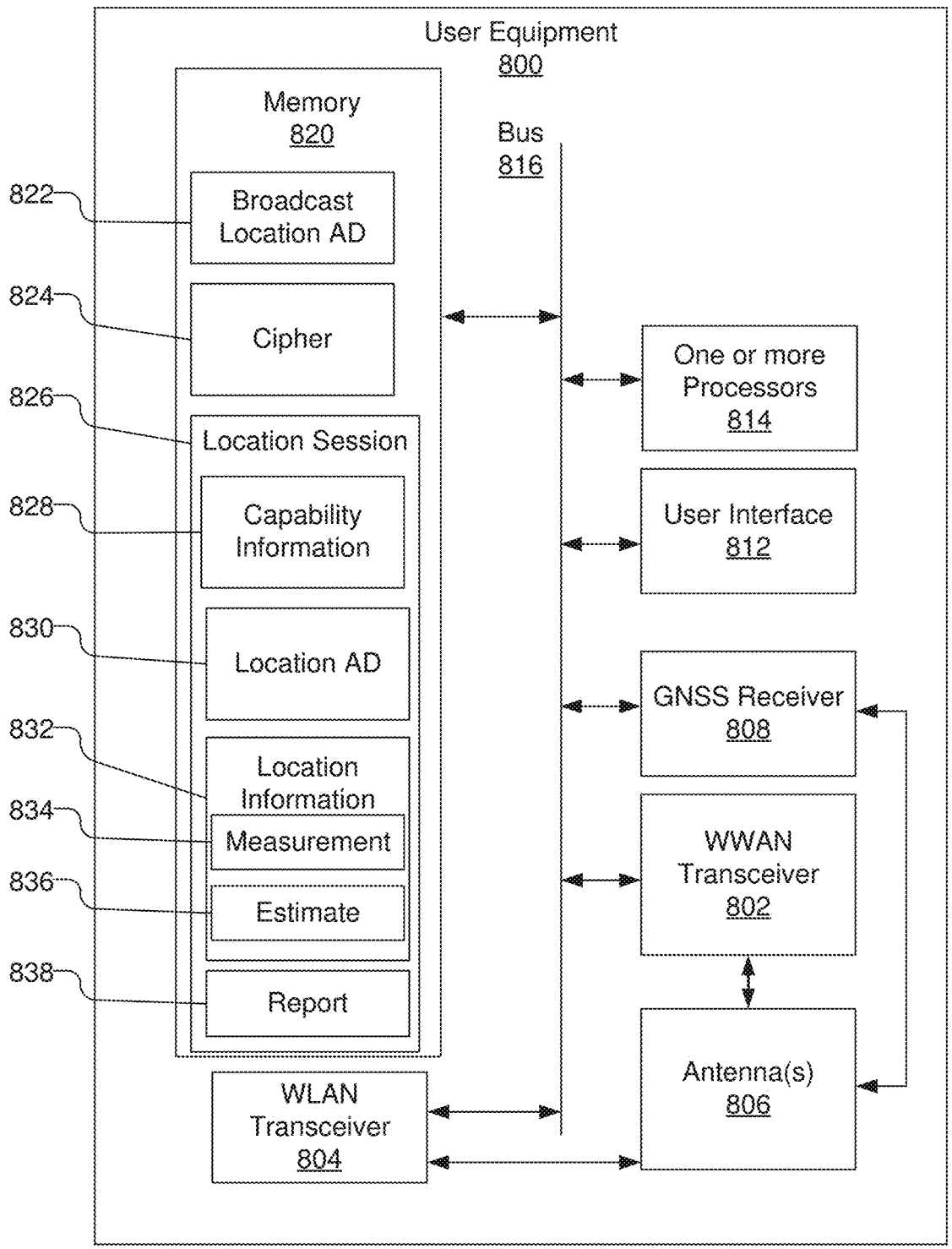
FIG. 8 shows an exemplary architecture of a mobile device.

FIG. 8 is a diagram illustrating an example of a hardware implementation of an UE 800, such as UE 102 illustrated in FIGS. 1A and 1B. The UE 800 may include a WWAN transceiver 802 to wirelessly communicate with, e.g., cellular transceivers such as one or more evolved Node Bs (eNBs), a next generation eNB (ng-eNB), a New Radio (NR) Node B (gNB). The UE 800 may also include a WLAN transceiver 804 to wirelessly communicate with local transceivers (e.g. WiFi APs or Bluetooth beacons). The UE 800 may include one or more antennas 806 that may be used with the WWAN transceiver 802 and WLAN transceiver 804. The UE 800 may further include a GNSS receiver 808 for receiving and measuring signals from GNSS SVs 160 (shown in FIGS. 1A and 1B). The UE 800 may further include a user interface 812 that may include e.g., a display, a keypad or other input device, such as virtual keypad on the display, through which a user may interface with the UE 800.

The UE 800 further includes one or more processors 814 and memory 820, which may be coupled together with bus 816. The one or more processors 814 and other components of the UE 800 may similarly be coupled together with bus 816, a separate bus, or may be directly connected together or coupled using a combination of the foregoing. The memory 820 may store data, such as location assistance data and location information, and may contain executable code or software and/or firmware instructions that when executed by the one or more processors 814 cause the one or more processors 814 to operate as a special purpose computer programmed to perform the techniques disclosed herein. As illustrated in FIG. 8, the memory 820 may include one or more components or modules that may be implemented by the one or more processors 814 to perform the methodologies described herein. While the components or modules are illustrated as software (or firmware) in memory 820 that is executable by the one or more processors 814, it should be understood that the components or modules may be dedicated hardware either in the one or more processors 814 or off the processors.

A number of software modules and data tables may reside in the memory 820 and be utilized by the one or more processors 814 in order to manage both communications and the functionality described herein. It should be appreciated that the organization of the contents of the memory 820 as shown in FIG. 8 is merely exemplary, and the functionality of the modules and/or data structures may be combined, separated, and/or be structured in different ways depending upon the implementation of the UE 800.

As illustrated, the memory 820 may include a broadcast location assistance data (AD) module 822 that when implemented by the one or more processors 814 configures the one or more processors 814 to receive, e.g., via the WWAN transceiver 802, a first set of location assistance data that is broadcast by at least one wireless node, as shown at stage 3 of signaling flow 200, block 310 of signaling flow 300 or block 425 of signaling flow 400. In some implementations, the memory 820 may include a cipher module 824 that when implemented by the one or more processors 814 configures the one or more processors 814 to receive, e.g., via the WWAN transceiver 802 or the WLAN transceiver 804, at least one ciphering key and to decipher at least a portion of the first set of location assistance data using the at least one ciphering key, e.g., using the 128-bit Advanced Encryption Standard (AES) algorithm defined by the National Institute of Standards and Technology (NIST) in the United States or other appropriate deciphering algorithms, as shown at stage 5 of signaling flow 200, block 312 of signaling flow 300 or block 430 of signaling flow 400.

The memory 820 may further include a location session module 826 that when implemented by the one or more processors 814 configures the one or more processors 814 to engage in a location session with a location server as discussed herein, e.g., as at actions and blocks 315-355 in signaling flow 300 and actions and blocks 435-480 in signaling flow 400. For example, the memory 820 may include a capability information module 828 that stores the capabilities of the UE 800, including an indication of a level of support by the UE 800 for receiving location assistance data via broadcast as discussed above, and when implemented by the one or more processors 814 configures the one or more processors 814 to transmit via the WWAN transceiver 802 the capability information to a location server, which may be transmitted, e.g., in response to receiving a request for capability information from the location server. The location session module 826 in the memory 820 may further include a location assistance data module 830 that when implemented by the one or more processors 814 configures the one or more processors 814 to receive broadcast location assistance data, e.g., from broadcast location AD module 822, as well to receive via the WWAN transceiver 802, a second set of location assistance data from the location server.

The location session module 826 in the memory 820 may further include a location information module 832 that when implemented by the one or more processors 814 configures the one or more processors 814 to obtain, e.g., via one or more of the WWAN transceiver 802, the WLAN transceiver 804, and the GNSS receiver 808, at least some location information based at least in part on a first set of location assistance data received via broadcast and may further use a second set of location assistance data, if received from a location server by point to point means. For example, the location information module 832 may include a measurement module 834 that when implemented by the one or more processors 814 configures the one or more processors 814 to obtain location measurements, such as may include measurements of RSTD obtained by measuring PRS or other reference signals (e.g. CRS signals) received by WWAN transceiver 802 and/or WLAN transceiver 804, measurements of RTT obtained by measuring signals received/transmitted by WWAN transceiver 802 and/or WLAN transceiver 804, and/or measurements of pseudorange, code phase or carrier phase obtained by measuring one or more GNSS navigation signals received by GNSS receiver 808. The location information module 832 may include an estimate module 836 that when implemented by the one or more processors 814 configures the one or more processors 814 to determine a location estimate for the UE 800, e.g., using the measurements obtained using measurement module 834. The location session module 826 may further include a report module 838 that transmits, e.g., via the WWAN transceiver 802, at least some of the obtained location information to a location server.

The methodologies described herein may be implemented by various means depending upon the application. For example, these methodologies may be implemented in hardware, firmware, software, or any combination thereof. For a hardware implementation, the one or more processors 814 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 820) and executed by one or more processors 814, causing the one or more processors 814 to operate as a special purpose computer programmed to perform the techniques disclosed herein. Memory may be implemented within the one or processors 814 or external to the one or more processors 814. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 800 may be stored as one or more instructions or code on a non-transitory computer-readable storage medium such as memory 820. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 800 may be provided as signals on transmission media included in a communication apparatus. For example, a communication apparatus comprising part or all of UE 800 may include a transceiver having signals indicative of instructions and data. The instructions and data are stored on non-transitory computer readable media, e.g., memory 820, and are configured to cause the one or more processors 814 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 800, may include a means for receiving a first set of location assistance data that is broadcast by at least one wireless node, which may be, e.g., the WWAN transceiver 802 and one or more processors 814 with dedicated hardware or implementing executable code or software instructions in memory 820 such as the broadcast location assistance data module 822. A means for transmitting capability information to a location server comprising an indication of a level of UE support for receiving location assistance data via broadcast may be e.g., the WWAN transceiver 802 and one or more processors 814 with dedicated hardware or implementing executable code or software instructions in memory 820 such as the capability information module 828. A means for receiving a request for location information from the location server may be, e.g., the WWAN transceiver 802 and one or more processors 814 with dedicated hardware or implementing executable code or software instructions in memory 820 such as the location information module 832. A means for obtaining at least some of the location information based at least in part on the first set of location assistance data may be, e.g., the WWAN transceiver 802, the WLAN transceiver 804, and/or the GNSS receiver 808, and one or more processors 814 with dedicated hardware or implementing executable code or software instructions in memory 820 such as the broadcast location AD module 822 and the location information module 832, such as the measurement module 834 and/or the estimate module 836. A means for transmitting the at least some of the location information to the location server may be, e.g., the WWAN transceiver 802 and one or more processors 814 with dedicated hardware or implementing executable code or software instructions in memory 820 such as the report module 838.

The UE 800 may further include a means for receiving a second set of location assistance data from the location server, wherein the second set of location assistance data comprises location assistance data not received in the first set of location assistance data, which may be, e.g., the WWAN transceiver 802 and one or more processors 814 with dedicated hardware or implementing executable code or software instructions in memory 820 such as the location assistance data module 830. A means for obtaining at least some of the location information based at least in part on the first set of location assistance data and the second set of location assistance data may include the WWAN transceiver 802, the WLAN transceiver 804, and/or the GNSS receiver 808, and one or more processors 814 with dedicated hardware or implementing executable code or software instructions in memory 820 such as the broadcast location AD module 822 and location assistance data module 830, and the location information module 832, such as the measurement module 834 and/or the estimate module 836.

The UE 800 may further include a means for receiving a request for the capability information from the location server, which may be, e.g., the WWAN transceiver 802 and one or more processors 814 with dedicated hardware or implementing executable code or software instructions in memory 820 such as the capability information module 828. A means for transmitting the capability information in response to receiving the request may be, e.g., the WWAN transceiver 802 and one or more processors 814 with dedicated hardware or implementing executable code or software instructions in memory 820 such as the capability information module 828.

The UE 800 may further include a means for receiving at least one ciphering key, which may be, e.g., the WWAN transceiver 802 and one or more processors 814 with dedicated hardware or implementing executable code or software instructions in memory 820 such as the cipher module 824. A means for deciphering the at least a portion of the first set of location assistance data based on the at least one ciphering key may be, e.g., the one or more processors 814 with dedicated hardware or implementing executable code or software instructions in memory 820 such as the cipher module 824.

Figure 9:
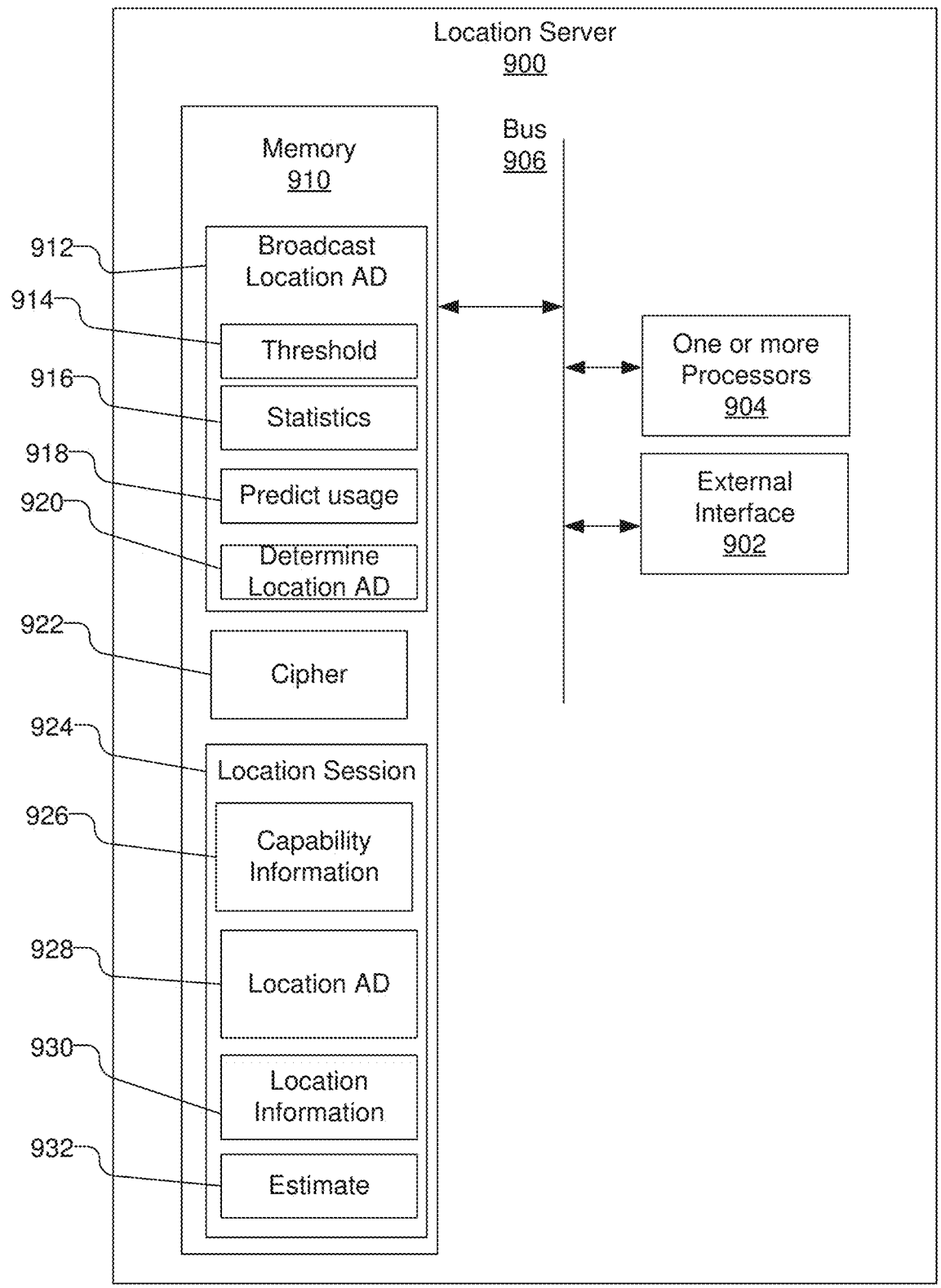
FIG. 9 shows an exemplary architecture of a location server.

FIG. 9 is a diagram illustrating an example of a hardware implementation of a location server 900. The location server 900 may be a location server, such as the E-SMLC 110 or H-SLP 118 in FIG. 1A or a Location Management Function (LMF) such as LMF 184 illustrated in FIG. 1B. The location server 900 includes, e.g., hardware components such as an external interface 902, which may be a wired or wireless interface capable of connecting to UE 102 and an external client directly or through one or more intermediary networks and/or one or more network entities. The location server 900 includes one or more processors 904 and memory 910, which may be coupled together with bus 906. The memory 910 may store data, such as location assistance data and location information, and may contain executable code or software (or firmware) instructions that when executed by the one or more processors 904 cause the one or more processors to operate as a special purpose computer programmed to perform the techniques disclosed herein. As illustrated in FIG. 9, the memory 910 may include one or more components or modules that may be implanted by the one or more processors 904 to perform the methodologies as described herein. While the components or modules are illustrated as software (or firmware) in memory 910 that is executable by the one or more processors 904, it should be understood that the components or modules may be dedicated hardware either in the one or more processors 904 or off the processors.

A number of software modules and data tables may reside in the memory 910 and be utilized by the one or more processors 904 in order to manage both communications and the functionality described herein. It should be appreciated that the organization of the contents of the memory 910 as shown in FIG. 9 is merely exemplary, and as such the functionality of the modules and/or data structures may be combined, separated, and/or be structured in different ways depending upon the implementation of the location server 900.

For example, the memory 910 may include a broadcast location assistance data (AD) module 912 that when implemented by the one or more processors 904 configures the one or more processors 904 to determine location assistance data to be broadcast and to cause the external interface 902 to provide the location assistance data to be broadcast to at least one wireless node, as shown at stages 1 and 2 of signaling flow 200, block 310 of signaling flow 300 or blocks 420 and 425 of signaling flow 400. The broadcast location AD module 912 may obtain capability information that is received from a plurality of UEs, e.g., using capability information module 926, and may determine types of location assistance data to be broadcast at different times and in different areas based on the received capability information. For example, a threshold module 914 when implemented by the one or more processors 904 configures the one or more processors 904 to determine whether there is a minimum threshold number or a minimum threshold proportion of UEs in the plurality of UEs for a particular type of location assistance data and/or whether there is a minimum threshold number or a minimum threshold proportion of UEs in the plurality of UEs for ciphering a particular type of location assistance data. Additionally or alternatively, a statistics module 916 when implemented by the one or more processors 904 configures the one or more processors 904 to determine accumulate statistics on the capability information received from the plurality of UEs for different times, e.g., time of day and/or day of week, and in different areas, e.g., different cells and/or Tracking Areas. The statistics, for example, may include the total number of UEs, an average or median number of UEs, etc., that are capable of receiving a particular type of location assistance data, ciphered or unciphered, at each different time and in each different area. A predict usage module 918 when implemented by the one or more processors 904 configures the one or more processors 904 to predict an expected usage or expected demand by UEs for different types of location assistance data at different times and in different areas using the accumulated statistics from statistics module 916. For example, the prediction may be based on an expectation of a demand for broadcast of location AD at a certain future time and in a certain area being similar to or the same as an average usage of location AD or an average capability to receive and use broadcast location AD by all UEs in the same area and at corresponding times in the past. A determine location AD module 920 when implemented by the one or more processors 904 configures the one or more processors 904 to determine the types of location assistance data to be broadcast at different times and in different areas based on the expected usage or expected demand from the predict usage module 918. In some implementations, the memory 910 may include a cipher module 922 that when implemented by the one or more processors 904 configures the one or more processors 904 to cipher one or more types of location assistance data that is to be broadcast e.g., using the 128-bit Advanced Encryption Standard (AES) algorithm defined by the National Institute of Standards and Technology (NIST) in the United States or other appropriate ciphering algorithms. The cipher module 922 may also configure the one or more processors 904 to send, via the external interface 902, at least one ciphering key to be used to decipher the ciphered location assistance data, as shown at stage 4 of signaling flow 200, block 312 of signaling flow 300 or block 430 of signaling flow 400.

The memory 910 may further include a location session module 924 that when implemented by the one or more processors 904 configures the one or more processors 904 to engage in a location session with a UE as discussed herein, e.g., at actions and blocks 315-355 in signaling flow 300 and actions and blocks 435-480 in signaling flow 400. For example, the memory 910 may include a capability information module 926 that when implemented by the one or more processors 904 configures the one or more processors 904 to receive, via the external interface 902, capability information from a UE, which may comprise an indication of a level of support by the UE for receiving location assistance data via broadcast. The capability information module 926 may further configure the one or more processors 904 to cause the external interface to send a request to the UE for the capability information. The location session module 924 in the memory 910 may further include a location assistance data module 928 that when implemented by the one or more processors 904 configures the one or more processors 904 to determine a second set of location assistance data based at least in part on a first set of location assistance data, which is provided for broadcast, and the capability information received by capability information module 926. For example, the determined second set of location assistance data may exclude types of location assistance data in the first set of location assistance data, and that the UE is capable of receiving as indicated in the received capability information. The location assistance data module 928 may further configure the one or more processors 904 to send the second set of the location assistance data to the UE when the second set of location assistance data is not a null set.

The location session module 924 may further include a location information module 930 that when implemented by the one or more processors 904 configures the one or more processors 904 to cause the external interface 902 to send a request for location information to the UE and to receive, via the external interface 902 location information from the UE, e.g. as at actions 335 and 345 in signaling flow 300. The location information may include location measurements, such as measurements of RSTD obtained by measuring PRS or other reference signals (e.g. CRS signals), measurements of RTT obtained by measuring signals, and/or measurements of pseudorange, code phase or carrier phase obtained by measuring one or more GNSS navigation signals. The location information may additionally or alternatively include a location estimate determined by the UE. The location information module 930 may configure the one or more processors 904 to additionally determine the location information that is requested based at least in part on the first set of location assistance data and the capability information received from the UE. The location information module 930 may configure the one or more processors 904 to determine at least one position method based at least in part on the first set of location assistance data and the capability information received from the UE, where the request for location information is for the at least one position method.

The location session module 924 may further include an estimate module 932 that when implemented by the one or more processors 904 configures the one or more processors 904 to compute or verify a location of the UE using the received location information.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of location server 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 910) and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by location server 900 may be stored as one or more instructions or code on a non-transitory computer-readable storage medium such as memory 910. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for location server 900 may be provided as signals on transmission media included in a communication apparatus. For example, a communication apparatus comprising part or all of location server 900 may include a transceiver having signals indicative of instructions and data. The instructions and data are stored on non-transitory computer readable media, e.g., memory 910, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server 900, such as the E-SMLC 110 or H-SLP 118 in FIG. 1A or a Location Management Function (LMF) such as LMF 184 in FIG. 1B, may include a means for providing a first set of location assistance data to be broadcast by at least one wireless node, which may be, e.g., the external interface 902 and one or more processors 904 with dedicated hardware or implementing executable code or software instructions in memory 910 such as the broadcast location AD module 912. A means for receiving capability information from the UE, the capability information comprising an indication of a level of UE support for receiving location assistance data via broadcast may be, e.g., the external interface 902 and one or more processors 904 with dedicated hardware or implementing executable code or software instructions in memory 910 such as the capability information module 926. A means for determining a second set of location assistance data based at least in part on the first set of location assistance data and the capability information may be, e.g., the one or more processors 904 with dedicated hardware or implementing executable code or software instructions in memory 910 such as the location AD module 928. A means for sending the second set of the location assistance data to the UE when the second set of location assistance data is not a null set may be, e.g., the external interface 902 and one or more processors 904 with dedicated hardware or implementing executable code or software instructions in memory 910 such as the location AD module 928. A means for sending a request for location information to the UE may be, e.g., the external interface 902 and one or more processors 904 with dedicated hardware or implementing executable code or software instructions in memory 910 such as the location information module 930. A means for receiving location information from the UE may be, e.g., the external interface 902 and one or more processors 904 with dedicated hardware or implementing executable code or software instructions in memory 910 such as the location information module 930. A means for determining an estimated location of the UE based on the location information may be, e.g., the one or more processors 904 with dedicated hardware or implementing executable code or software instructions in memory 910 such as the estimate module 932.

The location server 900 may also include a means for sending a request for the capability information to the UE, which may be, e.g., the external interface 902 and one or more processors 904 with dedicated hardware or implementing executable code or software instructions in memory 910 such as the capability information module 926.

The location server 900 may also include means for determining at least one position method based at least in part on the first set of location assistance data and the capability information, wherein the request for location information comprises a request for location information for the at least one position method, which may be, e.g., one or more processors 904 with dedicated hardware or implementing executable code or software instructions in memory 910 such as the capability information module 926.

The location server 900 may also include means for receiving capability information from a plurality of UEs, the capability information for each UE in the plurality of UEs comprising an indication of the level of UE support for receiving location assistance data via broadcast, which may be, e.g., the external interface 902 and one or more processors 904 with dedicated hardware or implementing executable code or software instructions in memory 910 such as the capability information module 926. A means for determining the first set of location assistance data based on the capability information received from the plurality of UEs may be, e.g., the one or more processors 904 with dedicated hardware or implementing executable code or software instructions in memory 910 such as the broadcast location AD module 912, including one or more of the threshold module 914, the statistics module 916, the predict usage module 918, and the determination location AD module 920. The capability information may be received from the plurality of UEs at a first set of times, wherein the plurality of UEs are in a first set of areas, where the location server may include a means for determining a second set of times and a second set of areas, based on the first set of times and the first set of areas may be, e.g., the one or more processors 904 with dedicated hardware or implementing executable code or software instructions in memory 910 such as the broadcast location AD module 912, including one or more of the threshold module 914, the statistics module 916, the predict usage module 918, and the determination location AD module 920. A means for providing the first set of location assistance data to be broadcast at least one time of the second set of times and in at least one area of the second set of areas, wherein the first set of location assistance data is broadcast by the at least one wireless node in the at least one area and at the at least one time may be, e.g., the external interface 902 and the one or more processors 904 with dedicated hardware or implementing executable code or software instructions in memory 910 such as the broadcast location AD module 912, including one or more of the threshold module 914, the statistics module 916, the predict usage module 918, and the determination location AD module 920.

In another implementation, the location server 900 may include a means for receiving capability information from a plurality of user equipments (UEs) at a first set of times, wherein the plurality of UEs are in a first set of areas, the capability information for each UE in the plurality of UEs comprising an indication of the level of UE support for receiving location assistance data via broadcast, which may be, e.g., the external interface 902 and one or more processors 904 with dedicated hardware or implementing executable code or software instructions in memory 910 such as the capability information module 926. A means for determining types of location assistance data to be broadcast at a second set of times and in a second set of areas by wireless nodes based on the capability information received from the plurality of UEs, the first set of areas and the first set of times may be, e.g., the one or more processors 904 with dedicated hardware or implementing executable code or software instructions in memory 910 such as the broadcast location AD module 912, including one or more of the threshold module 914, the statistics module 916, the predict usage module 918, and the determination location AD module 920. A means for providing location assistance data to be broadcast at the second set of times in the second set of areas by wireless nodes, the location assistance data comprising the types of location assistance data may be, e.g., the external interface 902 and the one or more processors 904 with dedicated hardware or implementing executable code or software instructions in memory 910 such as the broadcast location AD module 912.

The means for determining the types of location assistance data to be broadcast at the second set of times and in the second set of areas by the wireless nodes may further include a means for determining types of location assistance data included within the types of location assistance data in the capability information for at least a threshold number or a threshold proportion of UEs in the plurality of UEs, which may be, e.g., the one or more processors 904 with dedicated hardware or implementing executable code or software instructions in memory 910 such as the broadcast location AD module 912 including the threshold module 914 and determine location AD module 920.

The location server 900 may further include a means for ciphering at least a portion of the types of location assistance data, wherein the capability information received from the plurality of UEs indicates a capability to receive and decipher the at least a portion of the types of location assistance data by at least a threshold number of UEs or a threshold proportion of UEs in the plurality of UEs, which may be, e.g., the one or more processors 904 with dedicated hardware or implementing executable code or software instructions in memory 910 such as the cipher module 922 and the threshold module 914.

The means for determining the types of location assistance data to be broadcast at the second set of times and in the second set of areas by the wireless nodes may further include means for accumulating statistics on the capability information received from the plurality of UEs, the first set of times and the first set of areas, which may be, e.g., the one or more processors 904 with dedicated hardware or implementing executable code or software instructions in memory 910 such as the statistics module 916. A means for predicting an expected usage or expected demand for different types of location assistance data at different times and in different areas using the accumulated statistics may be, e.g., the one or more processors 904 with dedicated hardware or implementing executable code or software instructions in memory 910 such as the predict usage module 918. A means for determining the types of location assistance data to be broadcast at the second set of times and in the second set of areas by the wireless nodes based on the expected usage or expected demand may be, e.g., the one or more processors 904 with dedicated hardware or implementing executable code or software instructions in memory 910 such as the determination location AD module 920.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method of obtaining a location of a user equipment (UE) performed by a location server, the method comprising: providing a first set of location assistance data to be broadcast by at least one wireless node; receiving capability information from the UE, the capability information comprising an indication of a level of support by the UE for receiving location assistance data via broadcast; determining a second set of location assistance data based at least in part on the first set of location assistance data and the capability information; sending the second set of the location assistance data to the UE when the second set of location assistance data is not a null set; sending a request for location information to the UE; receiving at least some of the location information from the UE; and determining an estimated location of the UE based on the at least some of the location information.

There may be some implementations (2) of the above described method (1), wherein the location information comprises location measurements, a location estimate or both location measurements and a location estimate.

There may be some implementations (3) of the above described method (2), wherein the request for location information is determined by the location server based at least in part on the first set of location assistance data and the capability information.

There may be some implementations (4) of the above described method (1), wherein the indication of the level of support by the UE for receiving location assistance data via broadcast comprises at least one of: an identification of first System Information Blocks (SIBs) that can be received by the UE via broadcast, wherein the first SIBs comprise first types of location assistance data; an identification of second SIB s that can be received by the UE via broadcast, wherein the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, wherein the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, wherein the UE currently has access to the at least one RAT; or some combination of the foregoing.

There may be some implementations (5) of the above described method (4), wherein the first set of location assistance data comprises fifth types of location assistance data, wherein the second set of location assistance data excludes types of location assistance data included in both the fifth types of location assistance data and at least one of the first types of location assistance data, the second types of location assistance data, the third types of location assistance data or the fourth types of location assistance data.

There may be some implementations (6) of the above described method (4), wherein at least one of the first types of location assistance data, the second types of location assistance data, the third types of location assistance data or the fourth types of location assistance data comprise assistance data for at least one position method.

There may be some implementations (7) of the above described method (6), wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

There may be some implementations (8) of the above described method (4), wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

There may be some implementations (9) of the above described method (8), wherein the first set of location assistance data includes a third set of location assistance data for the at least one GNSS and the second set of location assistance data excludes the third set of location assistance data.

There may be some implementations (10) of the above described method (1), wherein the at least some of the location information is obtained by the UE based at least in part on the first set of location assistance data and the second set of location assistance data.

There may be some implementations (11) of the above described method (1), further comprising sending a request for the capability information to the UE, wherein the capability information is transmitted by the UE in response to receipt of the request.

There may be some implementations (12) of the above described method (1), further comprising determining at least one position method based at least in part on the first set of location assistance data and the capability information, wherein the request for location information comprises a request for location information for the at least one position method.

There may be some implementations (13) of the above described method (4), wherein at least a portion of the first set of location assistance data is ciphered, wherein the second set of location assistance data excludes at least some of the at least a portion.

There may be some implementations (14) of the above described method (13), wherein the indication of the level of support by the UE for receiving location assistance data via broadcast comprises the indication of the ability by the UE to receive location assistance data in ciphered form via broadcast.

There may be some implementations (15) of the above described method (13), wherein the indication of the level of support by the UE for receiving location assistance data via broadcast comprises the identification of the at least one ciphering key previously received by the UE, wherein the some of the at least a portion of the first set of location assistance data is ciphered using the at least one ciphering key.

There may be some implementations (16) of the above described method (13), wherein the some of the at least a portion of the first set of location assistance data is ciphered using at least one ciphering key, wherein the indication of the level of support by the UE for receiving location assistance data via broadcast excludes an indication of the UE having the at least one ciphering key, and further comprising including the at least one ciphering key in the second set of location assistance data.

There may be some implementations (17) of the above described method (1), wherein the at least one wireless node comprises an evolved Node B (eNB), a next generation eNB (ng-eNB), a New Radio (NR) Node B (gNB) or an IEEE 802.11 WiFi access point, or a combination thereof.

There may be some implementations (18) of the above described method (1), receiving capability information from a plurality of UEs, the capability information for each UE in the plurality of UEs comprising an indication of the level of support by the UE for receiving location assistance data via broadcast; and determining the first set of location assistance data based at least in part on the capability information received from the plurality of UEs.

There may be some implementations (19) of the above described method (18), wherein the capability information is received from the plurality of UEs at a first set of times, wherein the plurality of UEs are in a first set of areas, the method further comprising: determining a second set of times and a second set of areas, based on the first set of times and the first set of areas; and providing the first set of location assistance data to be broadcast at least one time of the second set of times and in at least one area of the second set of areas, wherein the first set of location assistance data is broadcast by the at least one wireless node in the at least one area and at the at least one time.

There may be some implementations (20) of the above described method (19), wherein the first set of areas and the second set of areas each comprises a set of cells, a set of Tracking Areas or a set of cells and a set of Tracking Areas.

One implementation (21) may be a location server for obtaining a location of a user equipment (UE), the location server comprising: an external interface configured to communicate with a wireless network; memory configured to store location assistance data and location information; and at least one processor coupled to the external interface and the memory and configured to provide via the external interface a first set of location assistance data to be broadcast by at least one wireless node, receive via the external interface capability information from the UE, the capability information comprising an indication of a level of support by the UE for receiving location assistance data via broadcast, determine a second set of location assistance data based at least in part on the first set of location assistance data and the capability information, send via the external interface the second set of the location assistance data to the UE when the second set of location assistance data is not a null set, send via the external interface a request for location information to the UE, receive via the external interface at least some of the location information from the UE, and determine an estimated location of the UE based on at least some of the the location information.

There may be some implementations (22) of the above described location server (21), wherein the location information comprises location measurements, a location estimate or both location measurements and a location estimate.

There may be some implementations (23) of the above described location server (22), wherein the request for location information is determined by the location server based at least in part on the first set of location assistance data and the capability information.

There may be some implementations (24) of the above described location server (21), wherein the indication of the level of support by the UE for receiving location assistance data via broadcast comprises at least one of: an identification of first System Information Blocks (SIBs) that can be received by the UE via broadcast, wherein the first SIBs comprise first types of location assistance data; an identification of second SIBs that can be received by the UE via broadcast, wherein the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, wherein the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, wherein the UE currently has access to the at least one RAT; or some combination of the foregoing.

There may be some implementations (25) of the above described location server (24), wherein the first set of location assistance data comprises fifth types of location assistance data, wherein the second set of location assistance data excludes types of location assistance data included in both the fifth types of location assistance data and at least one of the first types of location assistance data, the second types of location assistance data, the third types of location assistance data or the fourth types of location assistance data.

There may be some implementations (26) of the above described location server (24), wherein at least one of the first types of location assistance data, the second types of location assistance data, the third types of location assistance data or the fourth types of location assistance data comprise assistance data for at least one position method.

There may be some implementations (27) of the above described location server (26), wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

There may be some implementations (28) of the above described location server (24), wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

There may be some implementations (29) of the above described location server (28), wherein the first set of location assistance data includes a third set of location assistance data for the at least one GNSS and the second set of location assistance data excludes the third set of location assistance data.

There may be some implementations (30) of the above described location server (21), wherein the at least some of the location information is obtained by the UE based at least in part on the first set of location assistance data and the second set of location assistance data.

There may be some implementations (31) of the above described location server (21), wherein the at least one processor is further configured to send via the external interface a request for the capability information to the UE, wherein the capability information is transmitted by the UE in response to receipt of the request.

There may be some implementations (32) of the above described location server (21), wherein the at least one processor is further configured to determine at least one position method based at least in part on the first set of location assistance data and the capability information, wherein the request for location information comprises a request for location information for the at least one position method.

There may be some implementations (33) of the above described location server (24), wherein at least a portion of the first set of location assistance data is ciphered, wherein the second set of location assistance data excludes at least some of the at least a portion.

There may be some implementations (34) of the above described location server (33), wherein the indication of the level of support by the UE for receiving location assistance data via broadcast comprises the indication of the ability by the UE to receive location assistance data in ciphered form via broadcast.

There may be some implementations (35) of the above described location server (33), wherein the indication of the level of support by the UE for receiving location assistance data via broadcast comprises the identification of the at least one ciphering key previously received by the UE, wherein the some of the at least a portion of the first set of location assistance data is ciphered using the at least one ciphering key.

There may be some implementations (36) of the above described location server (33), wherein the some of the at least a portion of the first set of location assistance data is ciphered using at least one ciphering key, wherein the indication of the level of support by the UE for receiving location assistance data via broadcast excludes an indication of the UE having the at least one ciphering key, and wherein the at least one processor is further configured to include the at least one ciphering key in the second set of location assistance data.

There may be some implementations (37) of the above described location server (21), wherein the at least one wireless node comprises an evolved Node B (eNB), a next generation eNB (ng-eNB), a New Radio (NR) Node B (gNB) or an IEEE 802.11 WiFi access point, or a combination thereof.

There may be some implementations (38) of the above described location server (21), wherein the at least one processor is further configured to receive via the external interface capability information from a plurality of UEs, the capability information for each UE in the plurality of UEs comprising an indication of the level of support by the UE for receiving location assistance data via broadcast, and determine the first set of location assistance data based at least in part on the capability information received from the plurality of UEs.

There may be some implementations (39) of the above described location server (38), wherein the capability information is received from the plurality of UEs at a first set of times, wherein the plurality of UEs are in a first set of areas, the at least one processor is further configured to determine a second set of times and a second set of areas, based on the first set of times and the first set of areas, and provide via the external interface the first set of location assistance data to be broadcast at least one time of the second set of times and in at least one area of the second set of areas, wherein the first set of location assistance data is broadcast by the at least one wireless node in the at least one area and at the at least one time.

There may be some implementations (40) of the above described location server (39), wherein the first set of areas and the second set of areas each comprises a set of cells, a set of Tracking Areas or a set of cells and a set of Tracking Areas.

One implementation (41) may be a method of providing location assistance data by a location server, the method comprising: receiving capability information from a plurality of user equipments (UEs) at a first set of times, wherein the plurality of UEs are in a first set of areas, the capability information for each UE in the plurality of UEs comprising an indication of a level of support by the UE for receiving location assistance data via broadcast; determining types of location assistance data to be broadcast at a second set of times and in a second set of areas by wireless nodes, based at least in part on the capability information received from the plurality of UEs, the first set of areas and the first set of times; and providing location assistance data to be broadcast at the second set of times and in the second set of areas by the wireless nodes, the location assistance data comprising the types of location assistance data.

There may be one implementation (42) of the above described method (41), wherein the indication of the level of support by the UE for receiving location assistance data via broadcast comprises at least one of: an identification of first System Information Blocks (SIBs) that can be received by the UE via broadcast, wherein the first SIBs comprise first types of location assistance data; an identification of second SIB s that can be received by the UE via broadcast, wherein the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, wherein the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, wherein the UE currently has access to the at least one RAT; or some combination of the foregoing.

There may be one implementation (43) of the above described method (42), wherein at least one of the first types of location assistance data, the second types of location assistance data, the third types of location assistance data or the fourth types of location assistance data comprise assistance data for at least one position method.

There may be one implementation (44) of the above described method (43), wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

There may be one implementation (45) of the above described method (42), wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

There may be one implementation (46) of the above described method (42), wherein determining the types of location assistance data to be broadcast at the second set of times and in the second set of areas by the wireless nodes comprises determining types of location assistance data included within one or more of the first types of location assistance data, the second types of location assistance data, the third types of location assistance data and the fourth types of location assistance data for at least a minimum threshold number or a minimum threshold proportion of UEs in the plurality of UEs.

There may be one implementation (47) of the above described method (41), wherein the second set of areas include areas in the first set of areas.

There may be one implementation (48) of the above described method (47), wherein the first set of areas and the second set of areas each comprises a set of cells, a set of Tracking Areas or a set of cells and a set of Tracking Areas.

There may be one implementation (49) of the above described method (41), wherein the second set of times include times in the first set of times, wherein the first set of times and the second set of times are times of day, days of week or times of day and days of week.

There may be one implementation (50) of the above described method (42), further comprising ciphering at least a portion of the types of location assistance data, wherein the capability information received from the plurality of UEs indicates a capability to receive and decipher the at least a portion of the types of location assistance data by at least a minimum threshold number of UEs or a minimum threshold proportion of UEs in the plurality of UEs.

There may be one implementation (51) of the above described method (41), wherein the wireless nodes comprise at least one of an evolved Node B (eNB), a next generation eNB (ng-eNB), a New Radio (NR) Node B (gNB), an IEEE 802.11 WiFi access point, or a combination thereof.

There may be one implementation (52) of the above described method (41), wherein determining the types of location assistance data to be broadcast at the second set of times and in the second set of areas by the wireless nodes comprises: accumulating statistics on the capability information received from the plurality of UEs, the first set of times and the first set of areas; predicting an expected usage or expected demand for different types of location assistance data at different times and in different areas using the accumulated statistics; and determining the types of location assistance data to be broadcast at the second set of times and in the second set of areas by the wireless nodes based at least in part on the expected usage or expected demand.

One implementation (53) may be a location server for providing location assistance data, the location server comprising: an external interface configured to communicate with a wireless network; memory configured to store location assistance data; and at least one processor coupled to the external interface and the memory and configured to receive, via the external interface, capability information from a plurality of user equipments (UEs) at a first set of times, wherein the plurality of UEs are in a first set of areas, the capability information for each UE in the plurality of UEs comprising an indication of a level of support by the UE for receiving location assistance data via broadcast, determine types of location assistance data to be broadcast at a second set of times and in a second set of areas by wireless nodes, based at least in part on the capability information received from the plurality of UEs, the first set of areas and the first set of times, and provide, via the external interface, location assistance data to be broadcast at the second set of times and in the second set of areas by the wireless nodes, the location assistance data comprising the types of location assistance data.

There may be one implementation (54) of the above described location server (53), wherein the indication of the level of support by the UE for receiving location assistance data via broadcast comprises at least one of: an identification of first System Information Blocks (SIBs) that can be received by the UE via broadcast, wherein the first SIBs comprise first types of location assistance data; an identification of second SIB s that can be received by the UE via broadcast, wherein the second SIBs comprise second types of location assistance data in ciphered form; an identification of third types of location assistance data that can be received by the UE via broadcast; an identification of fourth types of location assistance data that can be received in ciphered form by the UE via broadcast; an identification of at least one ciphering key previously received by the UE, wherein the at least one ciphering key enables deciphering by the UE of location assistance data received in ciphered form by the UE via broadcast; an indication of an ability by the UE to receive location assistance data in ciphered form via broadcast; an indication of at least one Radio Access Technology (RAT) in which location assistance data is broadcast, wherein the UE currently has access to the at least one RAT; or some combination of the foregoing.

There may be one implementation (55) of the above described location server (54), wherein at least one of the first types of location assistance data, the second types of location assistance data, the third types of location assistance data or the fourth types of location assistance data comprise assistance data for at least one position method.

There may be one implementation (56) of the above described location server (55), wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

There may be one implementation (57) of the above described location server (54), wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

There may be one implementation (58) of the above described location server (54), wherein the at least one processor is configured to determine the types of location assistance data to be broadcast at the second set of times and in the second set of areas by the wireless nodes by being configured to determine types of location assistance data included within one or more of the first types of location assistance data, the second types of location assistance data, the third types of location assistance data and the fourth types of location assistance data for at least a minimum threshold number or a minimum threshold proportion of UEs in the plurality of UEs.

There may be one implementation (59) of the above described location server (53), wherein the second set of areas include areas in the first set of areas.

There may be one implementation (60) of the above described location server (59), wherein the first set of areas and the second set of areas each comprises a set of cells, a set of Tracking Areas or a set of cells and a set of Tracking Areas.

There may be one implementation (61) of the above described location server (53), wherein the second set of times include times in the first set of times, wherein the first set of times and the second set of times are times of day, days of week or times of day and days of week.

There may be one implementation (62) of the above described location server (54), wherein the at least one processor is further configured to cipher at least a portion of the types of location assistance data, wherein the capability information received from the plurality of UEs indicates a capability to receive and decipher the at least a portion of the types of location assistance data by at least a minimum threshold number of UEs or a minimum threshold proportion of UEs in the plurality of UEs.

There may be one implementation (63) of the above described location server (53), wherein the wireless nodes comprise at least one of an evolved Node B (eNB), a next generation eNB (ng-eNB), a New Radio (NR) Node B (gNB), an IEEE 802.11 WiFi access point, or a combination thereof.

There may be one implementation (64) of the above described location server (53), wherein the at least one processor is configured to determine the types of location assistance data to be broadcast at the second set of times and in the second set of areas by the wireless nodes by being configured to accumulate statistics on the capability information received from the plurality of UEs, the first set of times and the first set of areas, predict an expected usage or expected demand for different types of location assistance data at different times and in different areas using the accumulated statistics, and determine the types of location assistance data to be broadcast at the second set of times and in the second set of areas by the wireless nodes based at least in part on the expected usage or expected demand.

Therefore, it is intended that claimed subject matter not be limited to the particular examples disclosed, but that such claimed subject matter may also include all aspects falling within the scope of the appended claims, and equivalents thereof.

What is claimed is:

1. A method of obtaining a location of a user equipment (UE) performed by a location server, the method comprising:
   providing a first set of location assistance data to be broadcast by at least one wireless node;
   receiving capability information from the UE, the capability information comprising an indication of a level of support by the UE for receiving location assistance data via broadcast;
   determining a second set of location assistance data based at least in part on the first set of location assistance data and the capability information;
   sending the second set of the location assistance data to the UE when the second set of location assistance data is not a null set;
   sending a request for location information to the UE;
   receiving at least some of the location information from the UE; and
   determining an estimated location of the UE based on the at least some of the location information.

2. The method of claim 1, wherein the location information comprises location measurements, a location estimate or both the location measurements and the location estimate.

3. The method of claim 2, wherein the request for location information is determined by the location server based at least in part on the first set of location assistance data and the capability information.

4. The method of claim 1, wherein the indication of the level of support by the UE for receiving location assistance data via broadcast comprises at least one of:
   an identification of first System Information Blocks (SIBs) that can be received by the UE via broadcast, wherein the first SIBs comprise first types of location assistance data;
   an identification of second SIBs that can be received by the UE via broadcast, wherein the second SIBs comprise second types of location assistance data in ciphered form;

an identification of third types of location assistance data that can be received by the UE via broadcast;

an identification of fourth types of location assistance data that can be received in ciphered form by the UE via broadcast;

an identification of at least one ciphering key previously received by the UE, wherein the at least one ciphering key enables deciphering by the UE of location assistance data received in ciphered form by the UE via broadcast;

an indication of an ability by the UE to receive location assistance data in ciphered form via broadcast;

an indication of at least one Radio Access Technology (RAT) in which location assistance data is broadcast, wherein the UE currently has access to the at least one RAT; or some combination of the foregoing.

5. The method of claim 4, wherein the first set of location assistance data comprises fifth types of location assistance data, wherein the second set of location assistance data excludes types of location assistance data included in both the fifth types of location assistance data and at least one of the first types of location assistance data, the second types of location assistance data, the third types of location assistance data or the fourth types of location assistance data.

6. The method of claim 4, wherein at least one of the first types of location assistance data, the second types of location assistance data, the third types of location assistance data or the fourth types of location assistance data comprise assistance data for at least one position method.

7. The method of claim 6, wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

8. The method of claim 4, wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

9. The method of claim 8, wherein the first set of location assistance data includes a third set of location assistance data for the at least one GNSS and the second set of location assistance data excludes the third set of location assistance data.

10. The method of claim 4, wherein at least a portion of the first set of location assistance data is ciphered, wherein the second set of location assistance data excludes at least some of the at least the portion.

11. The method of claim 10, wherein the indication of the level of support by the UE for receiving location assistance data via broadcast comprises the indication of the ability by the UE to receive location assistance data in ciphered form via broadcast.

12. The method of claim 10, wherein the indication of the level of support by the UE for receiving location assistance data via broadcast comprises the identification of the at least one ciphering key previously received by the UE, wherein the some of the at least the portion of the first set of location assistance data is ciphered using the at least one ciphering key.

13. The method of claim 10, wherein the some of the at least the portion of the first set of location assistance data is ciphered using at least one ciphering key, wherein the indication of the level of support by the UE for receiving location assistance data via broadcast excludes an indication of the UE having the at least one ciphering key, and further comprising including the at least one ciphering key in the second set of location assistance data.

14. The method of claim 1, wherein the at least some of the location information is obtained by the UE based at least in part on the first set of location assistance data and the second set of location assistance data.

15. The method of claim 1, further comprising sending a request for the capability information to the UE, wherein the capability information is transmitted by the UE in response to receipt of the request.

16. The method of claim 1, further comprising determining at least one position method based at least in part on the first set of location assistance data and the capability information, wherein the request for location information comprises a request for location information for the at least one position method.

17. The method of claim 1, wherein the at least one wireless node comprises an evolved Node B (eNB), a next generation eNB (ng-eNB), a New Radio (NR) Node B (gNB) or an IEEE 802.11 WiFi access point, or a combination thereof.

18. The method of claim 1, further comprising receiving capability information from a plurality of UEs, the capability information for each UE in the plurality of UEs comprising an indication of the level of support by the each UE for receiving location assistance data via broadcast; and
determining the first set of location assistance data based at least in part on the capability information received from the plurality of UEs.

19. The method of claim 18, wherein the capability information is received from the plurality of UEs at a first set of times, wherein the plurality of UEs are in a first set of areas, the method further comprising:
determining a second set of times and a second set of areas, based on the first set of times and the first set of areas; and
providing the first set of location assistance data to be broadcast at least one time of the second set of times and in at least one area of the second set of areas, wherein the first set of location assistance data is broadcast by the at least one wireless node in the at least one area and at the at least one time.

20. The method of claim 19, wherein the first set of areas and the second set of areas each comprises a set of cells, the set of Tracking Areas or the set of cells and a set of Tracking Areas.

21. A location server for obtaining a location of a user equipment (UE), the location server comprising:
an external interface configured to communicate with a wireless network;
memory configured to store location assistance data and location information; and
at least one processor coupled to the external interface and the memory and configured to:
provide via the external interface a first set of location assistance data to be broadcast by at least one wireless node;

receive via the external interface capability information from the UE, the capability information comprising an indication of a level of support by the UE for receiving location assistance data via broadcast;
determine a second set of location assistance data based at least in part on the first set of location assistance data and the capability information;
send via the external interface the second set of the location assistance data to the UE when the second set of location assistance data is not a null set;
send via the external interface a request for location information to the UE;
receive via the external interface at least some of the location information from the UE; and
determine an estimated location of the UE based on at least some of the location information.

22. The location server of claim 21, wherein the location information comprises location measurements, a location estimate or both the location measurements and the location estimate.

23. The location server of claim 22, wherein the request for location information is determined by the location server based at least in part on the first set of location assistance data and the capability information.

24. The location server of claim 21, wherein the indication of the level of support by the UE for receiving location assistance data via broadcast comprises at least one of:
an identification of first System Information Blocks (SIBs) that can be received by the UE via broadcast, wherein the first SIBs comprise first types of location assistance data;
an identification of second SIBs that can be received by the UE via broadcast, wherein the second SIBs comprise second types of location assistance data in ciphered form;
an identification of third types of location assistance data that can be received by the UE via broadcast;
an identification of fourth types of location assistance data that can be received in ciphered form by the UE via broadcast;
an identification of at least one ciphering key previously received by the UE, wherein the at least one ciphering key enables deciphering by the UE of location assistance data received in ciphered form by the UE via broadcast;
an indication of an ability by the UE to receive location assistance data in ciphered form via broadcast;
an indication of at least one Radio Access Technology (RAT) in which location assistance data is broadcast, wherein the UE currently has access to the at least one RAT; or
some combination of the foregoing.

25. The location server of claim 24, wherein the first set of location assistance data comprises fifth types of location assistance data, wherein the second set of location assistance data excludes types of location assistance data included in both the fifth types of location assistance data and at least one of the first types of location assistance data, the second types of location assistance data, the third types of location assistance data or the fourth types of location assistance data.

26. The location server of claim 24, wherein at least one of the first types of location assistance data, the second types of location assistance data, the third types of location assistance data or the fourth types of location assistance data comprise assistance data for at least one position method.

27. The location server of claim 26, wherein the at least one position method comprises UE assisted Assisted Global Navigation Satellite System (A-GNSS), UE based A-GNSS, UE assisted Observed Time Difference of Arrival (OTDOA), UE based OTDOA, UE assisted Wireless Local Area Network (WLAN), UE based WLAN, UE assisted Enhanced Cell ID (ECID), UE based ECID, UE assisted Real Time Kinematics (RTK), UE based RTK, UE assisted Precise Point Positioning (PPP), UE based PPP, or Differential GNSS (DGNSS), or a combination thereof.

28. The location server of claim 24, wherein the indication of the level of support by the UE for receiving location assistance data via broadcast further comprises an identification of at least one Global Navigation Satellite System (GNSS) for which the UE can receive at least one of the first types of location assistance data, the second types of location assistance data, the third types of location assistance data or the fourth types of location assistance data.

29. The location server of claim 28, wherein the first set of location assistance data includes a third set of location assistance data for the at least one GNSS and the second set of location assistance data excludes the third set of location assistance data.

30. The location server of claim 24, wherein at least a portion of the first set of location assistance data is ciphered, wherein the second set of location assistance data excludes at least some of the at least the portion.

31. The location server of claim 30, wherein the indication of the level of support by the UE for receiving location assistance data via broadcast comprises the indication of the ability by the UE to receive location assistance data in ciphered form via broadcast.

32. The location server of claim 30, wherein the indication of the level of support by the UE for receiving location assistance data via broadcast comprises the identification of the at least one ciphering key previously received by the UE, wherein the some of the at least the portion of the first set of location assistance data is ciphered using the at least one ciphering key.

33. The location server of claim 30, wherein the some of the at least the portion of the first set of location assistance data is ciphered using at least one ciphering key, wherein the indication of the level of support by the UE for receiving location assistance data via broadcast excludes an indication of the UE having the at least one ciphering key, and wherein the at least one processor is further configured to include the at least one ciphering key in the second set of location assistance data.

34. The location server of claim 21, wherein the at least some of the location information is obtained by the UE based at least in part on the first set of location assistance data and the second set of location assistance data.

35. The location server of claim 21, wherein the at least one processor is further configured to send via the external interface a request for the capability information to the UE, wherein the capability information is transmitted by the UE in response to receipt of the request.

36. The location server of claim 21, wherein the at least one processor is further configured to determine at least one position method based at least in part on the first set of location assistance data and the capability information, wherein the request for location information comprises a request for location information for the at least one position method.

37. The location server of claim 21, wherein the at least one wireless node comprises an evolved Node B (eNB), a next generation eNB (ng-eNB), a New Radio (NR) Node B (gNB) or an IEEE 802.11 WiFi access point, or a combination thereof.

38. The location server of claim 21, wherein the at least one processor is further configured to receive via the external interface capability information from a plurality of UEs, the capability information for each UE in the plurality of UEs comprising an indication of the level of support by the each UE for receiving location assistance data via broadcast, and determine the first set of location assistance data based at least in part on the capability information received from the plurality of UEs.

39. The location server of claim 38, wherein the capability information is received from the plurality of UEs at a first set of times, wherein the plurality of UEs are in a first set of areas, the at least one processor is further configured to determine a second set of times and a second set of areas, based on the first set of times and the first set of areas, and provide via the external interface the first set of location assistance data to be broadcast at least one time of the second set of times and in at least one area of the second set of areas, wherein the first set of location assistance data is broadcast by the at least one wireless node in the at least one area and at the at least one time.

40. The location server of claim 39, wherein the first set of areas and the second set of areas each comprises a set of cells, the set of Tracking Areas or the set of cells and a set of Tracking Areas.

41. A location server for obtaining a location of a user equipment (UE), the location server comprising:
   means for providing a first set of location assistance data to be broadcast by at least one wireless node;
   means for receiving capability information from the UE, the capability information comprising an indication of a level of support by the UE for receiving location assistance data via broadcast;
   means for determining a second set of location assistance data based at least in part on the first set of location assistance data and the capability information;
   means for sending the second set of the location assistance data to the UE when the second set of location assistance data is not a null set;
   means for sending a request for location information to the UE;
   means for receiving at least some of the location information from the UE; and
   means for determining an estimated location of the UE based on at least some of the location information.

42. A non-transitory storage medium including program code stored thereon, the program code is operable to configure at least one processor in a location server for obtaining a location of a user equipment (UE), the program code comprising instructions to:
   provide a first set of location assistance data to be broadcast by at least one wireless node;
   receive capability information from the UE, the capability information comprising an indication of a level of support by the UE for receiving location assistance data via broadcast;
   determine a second set of location assistance data based at least in part on the first set of location assistance data and the capability information;
   send the second set of the location assistance data to the UE when the second set of location assistance data is not a null set;
   send a request for location information to the UE;
   receive at least some of the location information from the UE; and
   determine an estimated location of the UE based on at least some of the location information.

* * * * *